United States Patent
Yoshioka et al.

(10) Patent No.: US 12,549,843 B2
(45) Date of Patent: Feb. 10, 2026

(54) COMPUTER-READABLE RECORDING MEDIUM STORING IDENTIFICATION PROGRAM, IDENTIFICATION METHOD, AND INFORMATION PROCESSING APPARATUS

(71) Applicant: FUJITSU LIMITED, Kawasaki (JP)

(72) Inventors: Takahiro Yoshioka, Tachikawa (JP); Natsuki Miyahara, Sagamihara (JP); Shuji Awai, Kawasaki (JP); Takeshi Konno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 562 days.

(21) Appl. No.: 17/868,847

(22) Filed: Jul. 20, 2022

(65) Prior Publication Data

US 2023/0057733 A1 Feb. 23, 2023

(30) Foreign Application Priority Data

Aug. 23, 2021 (JP) .................................. 2021-135622
Apr. 14, 2022 (JP) .................................. 2022-067242

(51) Int. Cl.
 *H04N 23/611* (2023.01)
 *G06V 40/10* (2022.01)

(52) U.S. Cl.
 CPC ........... *H04N 23/611* (2023.01); *G06V 40/10* (2022.01)

(58) Field of Classification Search
 CPC ........ G06V 10/82; G06V 40/10; G06V 20/52; G06V 40/103; G06V 40/16; G06V 10/70;
 (Continued)

(56) References Cited

U.S. PATENT DOCUMENTS 11,157,727 B2 * 10/2021 Hu ........................ G06V 10/82
2003/0076996 A1 4/2003 Neumann et al.
(Continued)

FOREIGN PATENT DOCUMENTS

JP 2005-233846 A 9/2005
JP 2005-266981 A 9/2005
(Continued)

OTHER PUBLICATIONS

Li, Shengzhe, et al. "A simplified nonlinear regression method for human height estimation in video surveillance." EURASIP Journal on Image and Video Processing 2015 (2015): 1-9 (Year: 2015).*
(Continued)

*Primary Examiner* — Henok Shiferaw
*Assistant Examiner* — Toluwani Mary-Jane Ijaseun
(74) *Attorney, Agent, or Firm* — Fujitsu Intellectual Property Center

(57) ABSTRACT

A non-transitory computer-readable recording medium stores an identification program for causing a computer to execute a process including: acquiring image data captured by a camera; generating skeleton information of a person included in an image frame and attribute information of the person included in the image frame by analyzing the image frame that constitutes the acquired image data; setting a first feature amount related to a height of the person for the person in the image frame based on the generated attribute information of the person; setting a second feature amount related to the height of the person for the person in the image frame based on the generated skeleton information; and specifying a parameter of the camera based on a difference between the first feature amount and the second feature amount.

9 Claims, 26 Drawing Sheets

(58) Field of Classification Search
CPC ............ G06T 2207/30196; G06T 7/80; H04N 23/611

See application file for complete search history.

(56) References Cited

U.S. PATENT DOCUMENTS

| | | | |
|---|---|---|---|
| 2008/0228422 | A1 | 9/2008 | Satoh |
| 2013/0169822 | A1* | 7/2013 | Zhu .......................... G06T 7/80 348/180 |
| 2015/0029345 | A1* | 1/2015 | Ikeda ........................ G06T 7/80 348/187 |
| 2018/0075593 | A1* | 3/2018 | Wang .................. G06V 40/103 |
| 2020/0013180 | A1* | 1/2020 | Yamaura .............. A61B 5/1072 |
| 2020/0273200 | A1* | 8/2020 | Ellwein ..................... G06T 7/73 |
| 2021/0019914 | A1* | 1/2021 | Lipchin .................. G06V 10/25 |
| 2021/0042962 | A1* | 2/2021 | Zhang ........................ G06T 7/80 |
| 2021/0398318 | A1 | 12/2021 | Deng et al. |
| 2022/0156977 | A1* | 5/2022 | Nakano ...................... G06T 3/08 |
| 2024/0104776 | A1 | 3/2024 | Yoshida |

FOREIGN PATENT DOCUMENTS

| | | |
|---|---|---|
| JP | 2008-224454 A | 9/2008 |
| JP | 2011-186788 A | 9/2011 |
| JP | 2014-170374 A | 9/2014 |
| WO | 2008/143523 A1 | 11/2008 |
| WO | 2021/095095 A1 | 5/2021 |
| WO | WO-2021084677 A1 * | 5/2021 ........... G06F 16/538 |

OTHER PUBLICATIONS

Araujo, Ricardo M., Gustavo GraÃ±a, and Virginia Andersson. "Towards skeleton biometric identification using the microsoft kinect sensor." Proceedings of the 28th Annual ACM Symposium on Applied Computing. 2013. (Year: 2013).*

Viswanath, P., Ioannis A. Kakadiaris, and Shishir K. Shah. "A simplified error model for height estimation using a single camera." 2009 IEEE 12th International Conference on Computer Vision Workshops, ICCV Workshops. IEEE, 2009. (Year: 2009).*

Jeges, Erno, Istvan Kispal, and Zoltan Hornak. "Measuring human height using calibrated cameras." 2008 Conference on Human System Interactions. IEEE, 2008. (Year: 2008).*

Jung, Jaehoon, et al. "Human height analysis using multiple uncalibrated cameras." 2016 IEEE International Conference on Consumer Electronics (ICCE). IEEE, 2016. (Year: 2016).*

Jung, Jaehoon, et al. "Object Detection and TrackingâBased Camera Calibration for Normalized Human Height Estimation." Journal of Sensors 2016.1 (2016): 8347841. (Year: 2016).*

Yoshioka, Takahiro, Shuji Awai, and Takeshi Konno. "Improving person re-identification based on human height information." 2021 International Conference on Engineering and Emerging Technologies (ICEET). IEEE, 2021. (Year: 2021).*

Sakina, Mosavi, Ilyas Muhammad, and Sani Sani Abdullahi. "A multi-factor approach for height estimation of an individual using 2D image." Procedia Computer Science 231 (2024): 765-770. (Year: 2024).*

Miyahara, Natsuki, Takahiro Yoshioka, and Takeshi Konno. "Camera Calibration Using Street Surveillance Camera for Detecting Wandering Elderly." 2022 IEEE 4th Global Conference on Life Sciences and Technologies (LifeTech). IEEE, 2022. (Year: 2022).*

Shengzhe Li et al., "A Simplified Nonlinear Regression Method for Human Height Estimation in Video Surveillance", Springer, EURASIP Journal on Image and Video Processing, DOI: 10.1186/s13640-015-0086-1, 2015 (Total 9 pages).

JPOA—Japanese Office Action mailed Sep. 2, 2025 for corresponding Japanese Patent Application No. 2022-067242 with Machine Translation.

* cited by examiner

FIG. 6

| ATTRIBUTE DATA | | STATISTICAL VALUES | |
|---|---|---|---|
| RACE | SEX | AVERAGE HEIGHT | VARIANCE |
| ASIAN | MALE | 172cm | 8 |
| ASIAN | FEMALE | 158cm | 8 |
| EUROPEAN | MALE | 176cm | 10 |
| EUROPEAN | FEMALE | 166cm | 11 |
| ... | ... | ... | ... |

| NUMBER OF EXECUTIONS | NUMBER OF EXECUTIONS | HEIGHT OF PERSON ID2 | ... | HEIGHT OF PERSON IDn | c | θ | f | EVALUATION VALUE 144 |
|---|---|---|---|---|---|---|---|---|
| 1 | 172 | 170 | ... | 166 | 250 | 10 | 680 | 4.3 |
| 2 | 166 | 171 | ... | 177 | 300 | 25 | 540 | 0.9 |
| ⋮ | ⋮ | ⋮ | ⋮ | ⋮ | | | | |
| N | 182 | 181 | ... | 180 | 400 | 35 | 600 | 10.2 | ns

COMPUTER-READABLE RECORDING MEDIUM STORING IDENTIFICATION PROGRAM, IDENTIFICATION METHOD, AND INFORMATION PROCESSING APPARATUS

CROSS-REFERENCE TO RELATED APPLICATION

This application is based upon and claims the benefit of priority of the prior Japanese Patent Application Nos. 2022-67242, filed on Apr. 14, 2022, and 2021-135622, filed on Aug. 23, 2021, the entire contents of which are incorporated herein by reference.

FIELD

The embodiments discussed herein are related to a computer-readable recording medium storing an identification program and the like.

BACKGROUND

A video captured by a camera is used in various investigations, and may be important information. For example, by analyzing an image captured by a camera, it is possible to estimate not only clothing and hairstyle of a specific person but also a feature amount such as a height.

Shengzhe Li, et al., "A simplified nonlinear regression method for human height estimation in video surveillance", EURASIP Journal on Image and Video Processing, 2015 is disclosed as related art.

SUMMARY

According to an aspect of the embodiments, a non-transitory computer-readable recording medium stores an identification program for causing a computer to execute a process including: acquiring image data captured by a camera; generating skeleton information of a person included in an image frame and attribute information of the person included in the image frame by analyzing the image frame that constitutes the acquired image data; setting a first feature amount related to a height of the person for the person in the image frame based on the generated attribute information of the person; setting a second feature amount related to the height of the person for the person in the image frame based on the generated skeleton information; and specifying a parameter of the camera based on a difference between the first feature amount and the second feature amount.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of a data structure of an attribute table;

FIG. 7 is a diagram illustrating an example of a data structure of an evaluation table;

DESCRIPTION OF EMBODIMENTS

Although a position of the camera and parameters of a lens are used to estimate the height of the person from the image captured by the camera, it is unlikely that the parameters of the installed camera are recorded. In the description below, the parameters related to the camera are referred to as "camera parameters" as appropriate.

For example, the camera parameters are estimated by using an image including a person whose height is known.

Figure 25:
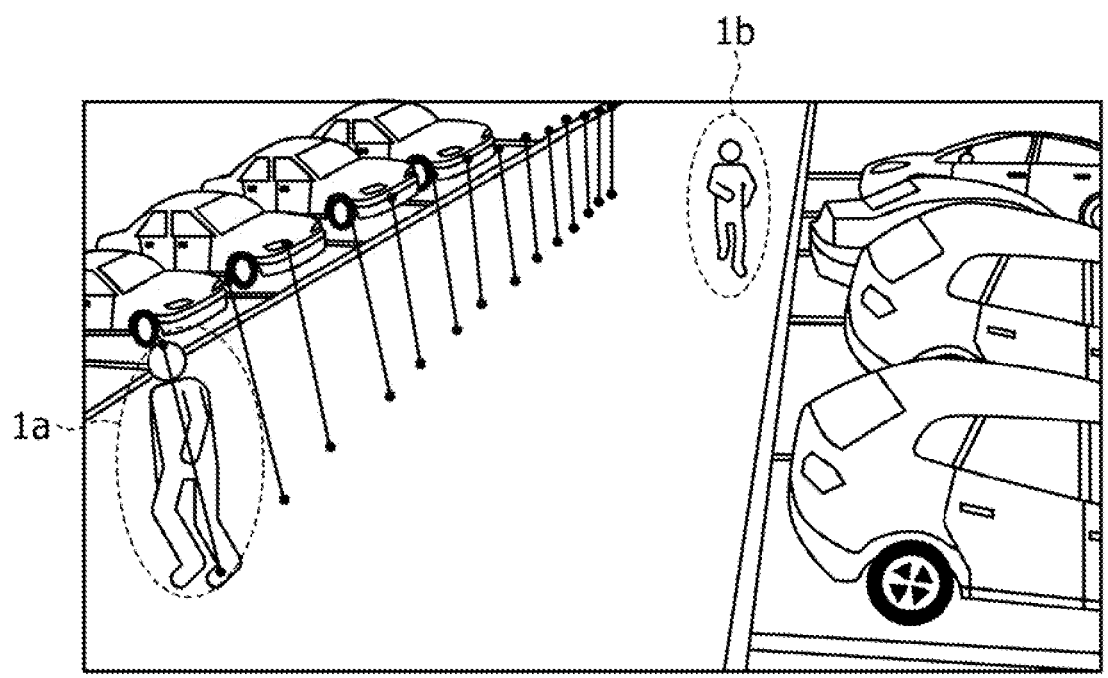
FIG. 25 is a diagram.

FIG. 25 is a diagram. The camera parameters are estimated by using a known height of a person 1a. A height of a person 1b having an unknown height is calculated by using the estimated camera parameters.

Figure 26:
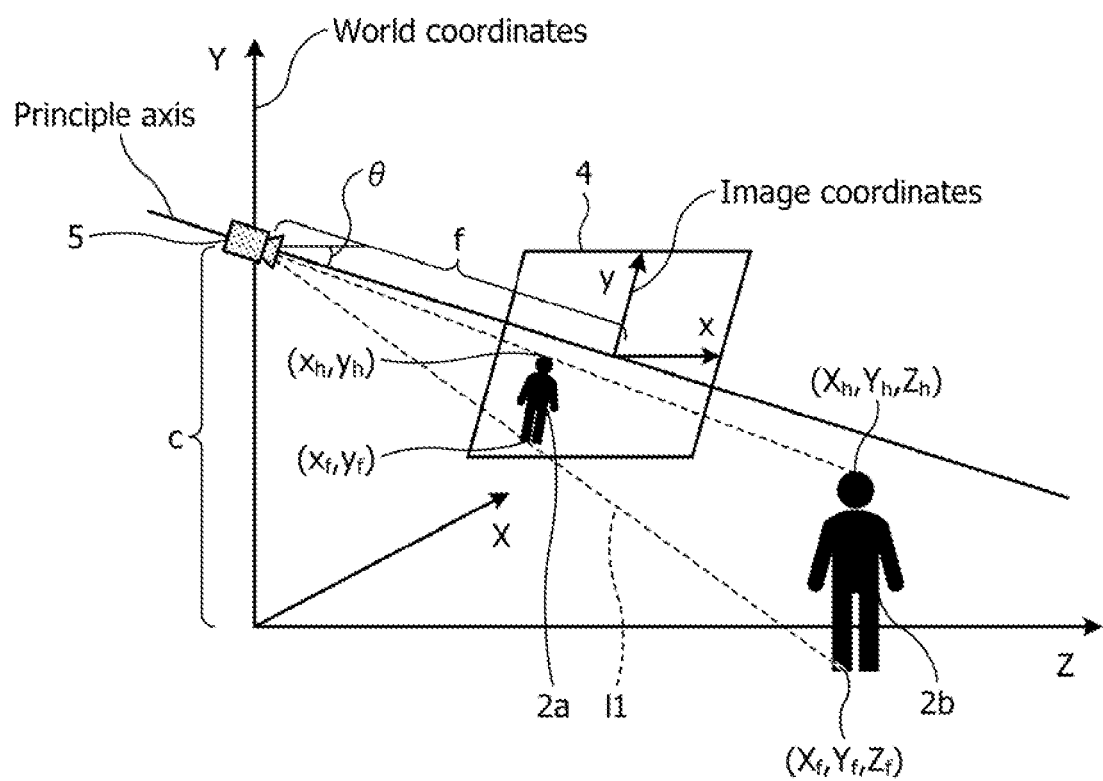
FIG. 26 is a diagram for describing estimation of camera parameters.

FIG. 26 is a diagram for describing estimation of the camera parameters. A height c of a camera 5, an angle θ of the camera 5, and a focal length f of the camera 5 are used as the camera parameters. Image data 4 is analyzed to specify coordinates (xf, yf) of a foot of a person 2a and coordinates (xh, yh) of a head of the person 2a in an image coordinate system (x, y).

Based on the camera parameters, an intersection (Xf, Yf, Zf) between a line segment l1 passing through the camera 5 and the coordinates (xf, yf) of the foot of the person 2a and an XZ plane of a world coordinate system is calculated as coordinates of a foot of a person 2b in the world coordinate system. Since there is an assumption that the height of the person 2a is known, coordinates (Xh, Yh, Zh) of a head of the person 2b are calculated. The camera parameters are estimated from a relationship between the coordinates (xf, yf) and (xh, yh) in the image coordinate system and the coordinates (Xf, Yf, Zf) and (Xh, Yh, Zh) in the world coordinate system.

However, in a case where a height of a person included in an image of a camera is not known, there is a problem that the camera parameters may not be estimated and the feature amount of the person may not be calculated.

In an aspect, it is an object of the present disclosure to provide an identification program, an identification method, and an information processing apparatus that enable a feature amount of a person to be calculated.

Hereinafter, embodiments of an identification program, an identification method, and an information processing apparatus disclosed herein will be described in detail based on the drawings. These embodiments do not limit this disclosure.

First Embodiment

Figure 1:
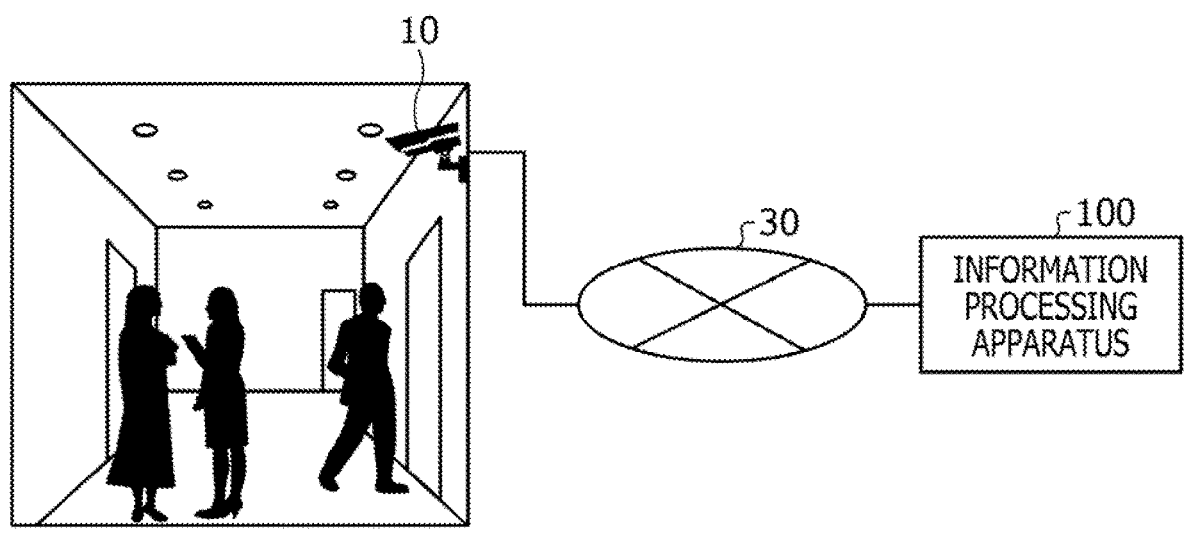
FIG. 1 is a diagram illustrating an example of a system according to a first embodiment.

FIG. 1 is a diagram illustrating an example of a system according to the present embodiment. As illustrated in FIG. 1, this system includes a camera 10 and an information processing apparatus 100. The camera 10 and the information processing apparatus 100 are coupled to each other via a network 30. Although only the camera 10 is illustrated in the example illustrated in FIG. 1, the system according to the present embodiment may include other cameras.

The camera 10 captures a video and transmits data of the captured video to the information processing apparatus 100. Hereinafter, the data of video transmitted by the camera 10 to the information processing apparatus 100 is referred to as video data. In the present embodiment, description will be given by using the video data in which a person is captured.

Figure 2:
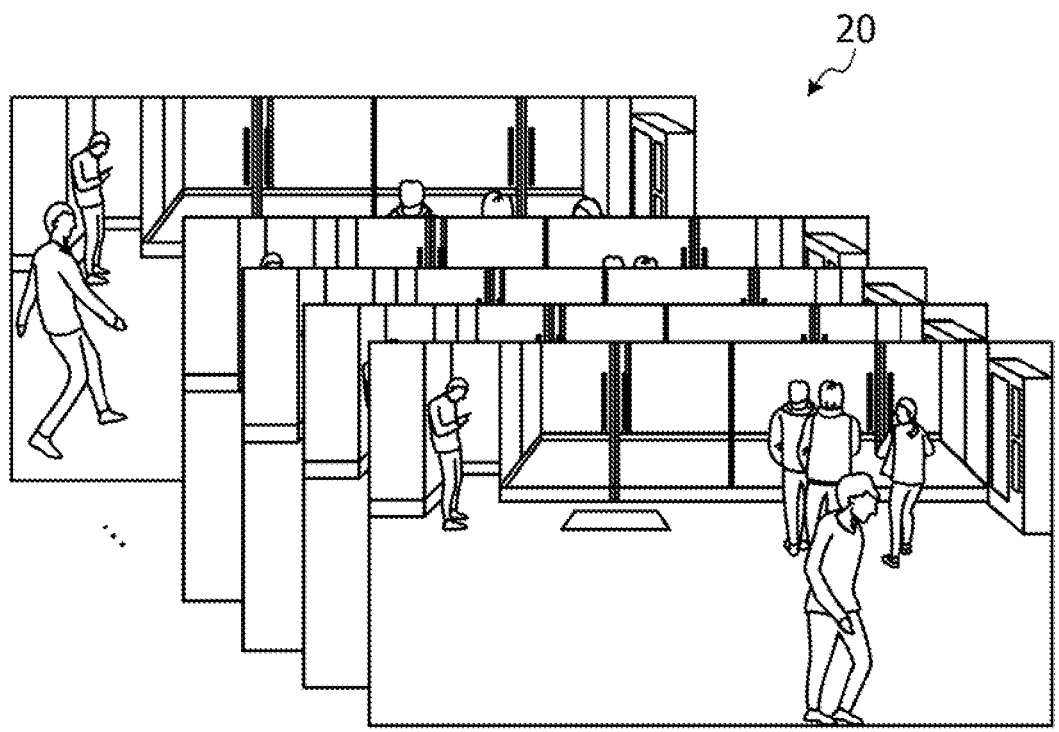
FIG. 2 is a diagram illustrating an example of video data.

FIG. 2 is a diagram illustrating an example of the video data. As illustrated in FIG. 2, video data 20 includes a plurality of time-series image frames. A frame number is assigned to each image frame in ascending order of time series. One image frame is a still image captured by the camera 10 at a certain timing.

The information processing apparatus 100 acquires the video data 20 from the camera 10, and sets camera parameters of the camera 10 based on the video data 20. Based on the set camera parameters, the information processing apparatus 100 calculates a feature amount of the person included in the video data 20. Although a case where a height is calculated as the feature amount of the person is described in the present embodiment, another feature amount of the person may be calculated. For example, the information processing apparatus 100 may calculate a length or the like of a predetermined part of the person as the feature amount of the person.

Figure 3:
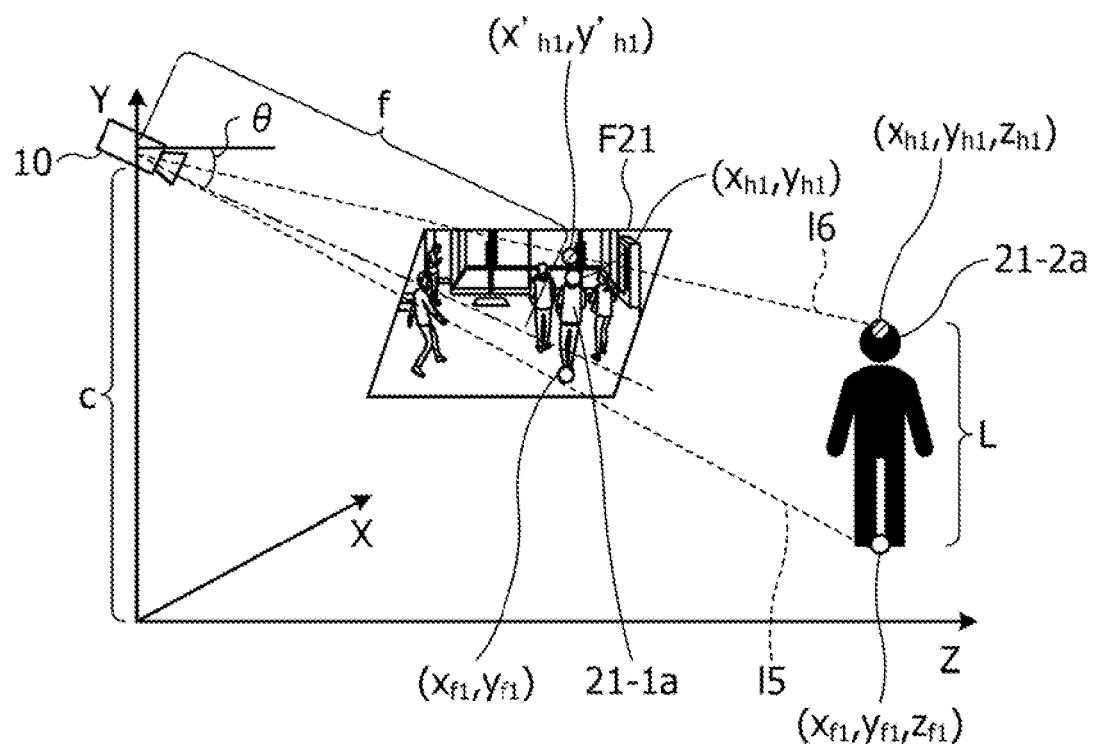
FIG. 3 is a diagram for describing processing of an information processing apparatus according to the first embodiment.

FIG. 3 is a diagram for describing processing of the information processing apparatus according to the present embodiment. FIG. 3 will be described by using an image frame F21 among the plurality of image frames included in the video data 20.

A coordinate system of the image frame F21 is an image coordinate system (x, y). A coordinate system in which a person actually exists is a world coordinate system (X, Y, Z). Hereinafter, a person in the image coordinate system imaged in the image frame F21 is referred to as a person 21-1a, and a person in the world coordinate system is referred to as a person 21-2a.

The camera parameters of the camera 10 include a height c of the camera 10, an angle θ of the camera 10, and a focal length f of the camera 10. The camera parameters of the camera 10 are unknown, and the information processing apparatus 100 sets initial values set in advance for the camera parameters.

By analyzing the image frame F21, the information processing apparatus 100 specifies skeleton data and attribute data of the person 21-1a. For example, the information processing apparatus 100 inputs the image frame F21 to a machine-learned learning model to specify the skeleton data and the attribute data of the person 21-1a. The learning model used by the information processing apparatus 100 will be described later.

The skeleton data includes information related to a plurality of joints of a person, and each joint is associated with coordinates in an image frame. For example, the skeleton data corresponding to the image frame F21 includes coordinates $(x_{h1}, y_{h1})$ of a head, coordinates $(x_{f1}, y_{f1})$ of a foot, and the like of the person 21-1a.

The attribute data includes information such as the race and sex of the person. The information processing apparatus 100 has an attribute table, and statistical values such as an average height and a variance corresponding to the attribute data are set in the attribute table.

Based on the camera parameters of the camera 10, the information processing apparatus 100 projects the coordinates $(x_{f1}, y_{f1})$ of the foot in the image coordinate system to the coordinates in the world coordinate system. For example, the information processing apparatus 100 calculates an intersection $(X_{f1}, Y_{f1}, Z_{f1})$ between a line segment l5 passing through the camera 10 and the coordinates $(x_{f1}, y_{f1})$ of the foot of the person 21-1a and an XZ plane of the world coordinate system, as the coordinates of the foot of the person 21-2a in the world coordinate system.

Based on the attribute table, the information processing apparatus 100 specifies the average height and the variance corresponding to the attribute data. Based on the specified average height and variance, the information processing apparatus 100 assigns a randomly allocated height L to the person 21-2a in the world coordinate system. Based on the coordinates of the foot of the person 21-2a and the height L, the information processing apparatus 100 calculates coordinates $(X_{h1}, Y_{h1}, Z_{h1})$ of a head of the person 21-2a.

Based on the camera parameters of the camera 10, the information processing apparatus 100 back-projects the coordinates $(X_{h1}, Y_{h1}, Z_{h1})$ of the head in the world coordinate system to the coordinates in the image coordinate system. For example, the information processing apparatus 100 calculates coordinates $(x'_{h1}, y'_{h1})$ of an intersection between a plane of the image coordinate system and a line segment l6 passing through the camera 10 and the coordinates ($X_{h1}$, $Y_{h1}$, $Z_{h1}$) of the head of the person 21-2a, and sets the calculated coordinates as the coordinates of the head of the person 21-1a in the image coordinate system.

For example, the information processing apparatus 100 sets a distance from the coordinates ($x_{f1}$, $y_{f1}$) of the foot to the coordinates ($x'_{h1}$, $y'_{h1}$) in the image coordinate system as a "first feature amount". The first feature amount corresponds to the height of the person 21-1a estimated based on the height L randomly allocated and the camera parameters of the camera 10.

The information processing apparatus 100 sets a distance from the coordinates ($x_{f1}$, $y_{f1}$) of the foot to the coordinates ($x_{h1}$, $y_{h1}$) of the head in the image coordinate system as a "second feature amount". The second feature amount corresponds to the height of the person 21-1a estimated based on the skeleton data.

The information processing apparatus 100 optimizes the camera parameters of the camera 10 so that a difference between the first feature amount and the second feature amount decreases in a state in which the height L is fixed.

After optimizing the camera parameters, the information processing apparatus 100 changes the height L assigned to the person 21-2a, and executes the above processing again. For each of the different heights L, the information processing apparatus 100 repeatedly executes the processing of specifying the optimized camera parameters. Accordingly, a plurality of optimized camera parameters are calculated for the different heights L.

The information processing apparatus 100 evaluates the plurality of optimized camera parameters, and acquires camera parameters having a best evaluation value as a final result. By using the camera parameters acquired as the final result, the information processing apparatus 100 calculates the height of the person 21-2a.

As described above, the information processing apparatus 100 according to the present embodiment randomly assigns a temporary height L from the attribute data of the person, and calculates the first feature amount of the person in the image calculated from the temporary height and the second feature amount of the person in the image calculated from the skeleton data. The information processing apparatus 100 estimates camera parameters so that an error between the first feature amount and the second feature amount is minimized, and calculates a feature amount of a person. Accordingly, even when the height of the person is unknown, the camera parameters may be estimated, and an accuracy of the feature amount such as the height of the person may be improved by using such camera parameters.

Figure 4:
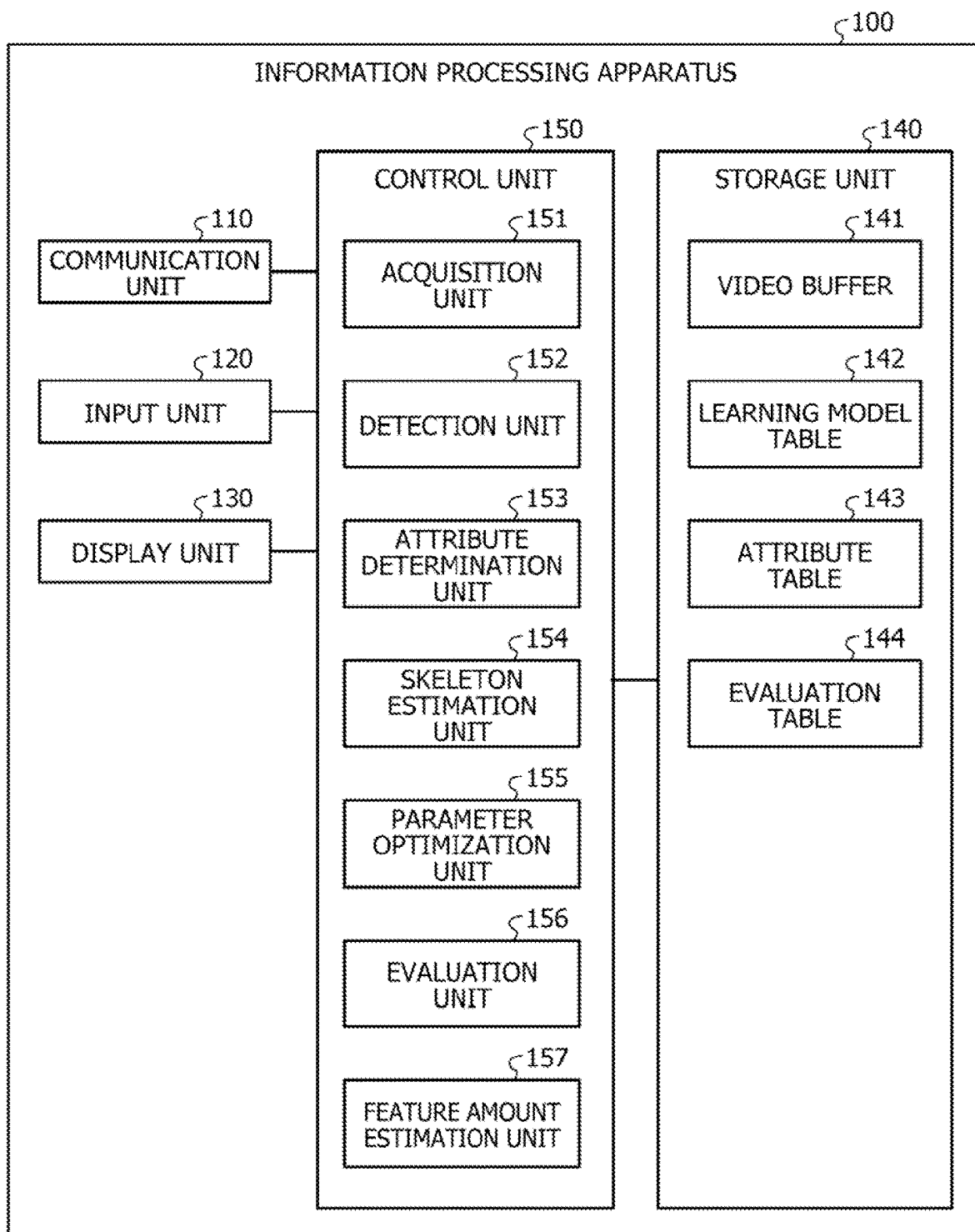
FIG. 4 is a functional block diagram illustrating a configuration of an information processing apparatus according to the first embodiment.

An example of a configuration of the information processing apparatus 100 according to the present embodiment will be described next. FIG. 4 is a functional block diagram illustrating a configuration of the information processing apparatus according to the present embodiment. As illustrated in FIG. 4, this information processing apparatus 100 includes a communication unit 110, an input unit 120, a display unit 130, a storage unit 140, and a control unit 150.

The communication unit 110 is coupled to the camera 10 via the network 30 and receives video data. For example, the communication unit 110 is realized by a network interface card (NIC) or the like. The communication unit 110 may be coupled to another external device or the like via the network 30.

The input unit 120 is an input device that inputs various kinds of information to the information processing apparatus 100. The input unit 120 corresponds to a keyboard, a mouse, a touch panel, or the like.

The display unit 130 is a display device that displays information output from the control unit 150. The display unit 130 corresponds to a liquid crystal display, an organic electro-luminescence (EL) display, a touch panel, or the like.

The storage unit 140 includes a video buffer 141, a learning model table 142, an attribute table 143, and an evaluation table 144. For example, the storage unit 140 is realized by a semiconductor memory element such as a random-access memory (RAM) or a flash memory, or a storage device such as a hard disk or an optical disk.

The video buffer 141 is a buffer that stores the video data 20 transmitted from the camera 10. A plurality of time-series image frames are included in the video data 20. It is assumed that a frame number is assigned to each image frame in ascending order of time series.

Figure 5:
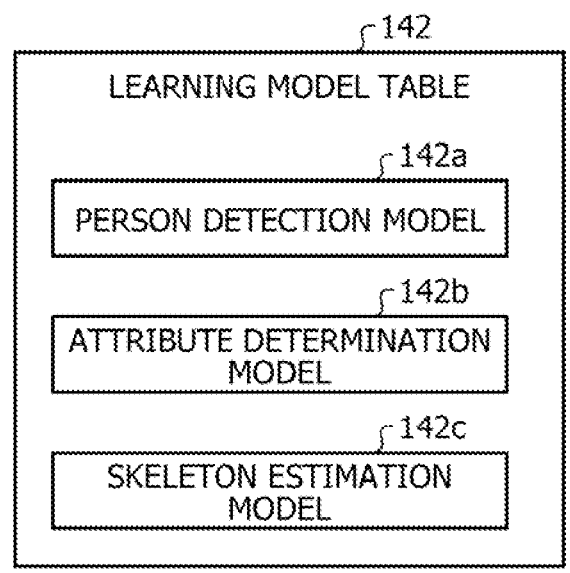
FIG. 5 is a diagram illustrating an example of a data structure of a learning model table.

The learning model table 142 is a table including various learning models. FIG. 5 is a diagram illustrating an example of a data structure of a learning model table. As illustrated in FIG. 5, the learning model table 142 includes a person detection model 142a, an attribute determination model 142b, and a skeleton estimation model 142c.

The person detection model 142a is a machine-learning model that, when the time-series image frames included in video data are input, detects a region of a person included in the image frames and tracks the region of the person. A person identifier (ID) for identifying a person is assigned to the person detected from the image frame. The person detection model 142a is realized by a machine-learning model such as DeepSort.

The attribute determination model 142b is a machine-learning model that outputs, when a region (face image or the like) of the person in the image frame is input, attribute data of this person.

The skeleton estimation model 142c is a machine-learning model that outputs, when a region (whole body image) of the person in the image frame is input, skeleton data of this person. The skeleton estimation model 142c may be realized by a machine-learning model such as OpenPose.

The person detection model 142a, the attribute determination model 142b, and the skeleton estimation model 142c correspond to a neural network (NN) or the like. It is assumed that for each of the person detection model 142a, the attribute determination model 142b, and the skeleton estimation model 142c, machine learning has been performed in advance based on a learning dataset. For example, the learning dataset of the attribute determination model 142b is a learning dataset having a plurality of pieces of learning data using a person's face image as input data and attribute data (race and sex) as a correct label.

The attribute table 143 is a table that defines statistical values corresponding to the attribute data. FIG. 6 is a diagram illustrating an example of a data structure of the attribute table. As illustrated in FIG. 6, this attribute table 143 associates the attribute data with statistical values. The attribute data includes race and sex. The statistical values include an average height and a variance.

The average height indicates an average value of heights of the individual persons corresponding to the corresponding race and sex. The variance is a variance (variation degree) of the heights of the individual persons corresponding to the corresponding race and sex. For example, the attribute table 143 indicates that the average height corresponding to the race "Asian" and the sex "male" is "172 cm" and the variance is "8".

The evaluation table 144 holds various kinds of information related to the camera parameters. FIG. 7 is a diagram illustrating an example of a data structure of an evaluation table. As illustrated in FIG. 7, this evaluation table 144 has the number of executions, heights of persons ID1 to IDn, c, θ, f, and an evaluation value.

The number of executions indicates the number of times the camera parameter optimization is performed. In the present embodiment, one execution of a series of processing of randomly allocating the height L, fixing the height L, and optimizing the camera parameters corresponds to the number of executions "1". For the number of executions "2", the height L is reassigned and the camera parameters are optimized. The same applies to a case where the number of executions is "3" and thereafter.

The height of the person ID indicates a height randomly assigned to a person identified by the person ID. For example, the height of the person ID1 indicates a height randomly assigned to a person with the person ID "1". The person ID is information for uniquely identifying a person. Although description is omitted in FIG. 3, in a case where a plurality of persons are detected from the same image frame, the person ID is assigned to each of the persons. Values of the optimized camera parameters are set in c, θ, and f. The evaluation value is an evaluation value related to the camera parameters, and a smaller value indicates better camera parameters.

The description returns to FIG. 4. The control unit 150 includes an acquisition unit 151, a detection unit 152, an attribute determination unit 153, a skeleton estimation unit 154, a parameter optimization unit 155, an evaluation unit 156, and a feature amount calculation unit 157. For example, the control unit 150 is realized by a central processing unit (CPU) or a microprocessor unit (MPU). The control unit 150 may also be realized by an integrated circuit such as an application-specific integrated circuit (ASIC) or a field-programmable gate array (FPGA), for example.

The acquisition unit 151 acquires the video data 20 from the camera 10 via the communication unit 110. The acquisition unit 151 registers the acquired video data 20 in the video buffer 141. While the camera 10 is capturing the video, the acquisition unit 151 continuously acquires the video data 20 and registers the video data 20 in the video buffer 141.

Figure 8:
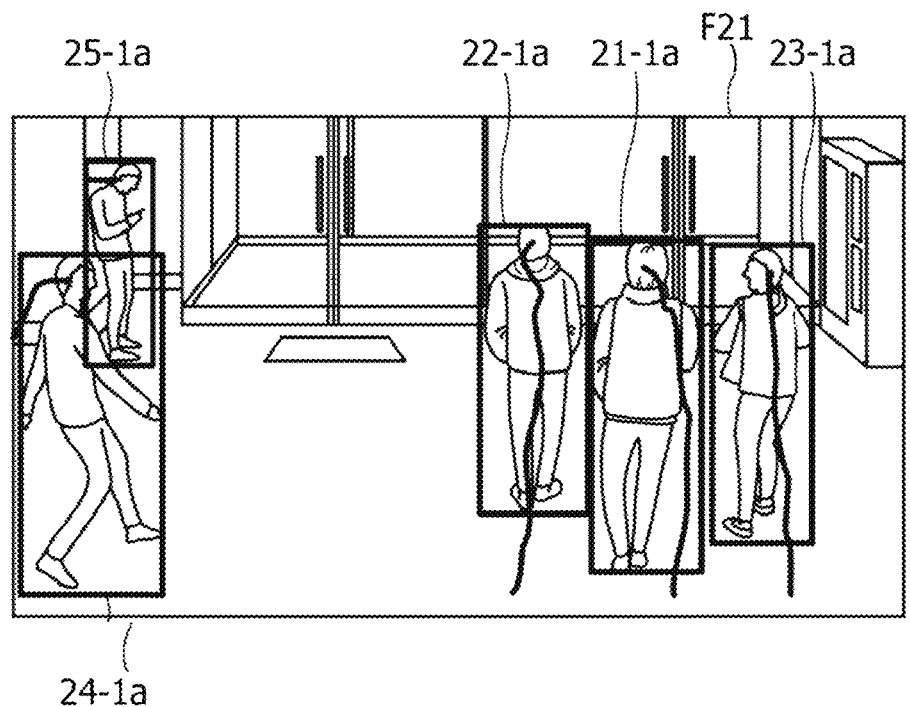
FIG. 8 is a diagram illustrating an example of a detection result of persons.

By acquiring the image frames from the video buffer 141 in time series and inputting the image frames to the person detection model 142a, the detection unit 152 detects a region of a person included in the image frames. FIG. 8 is a diagram illustrating an example of a detection result of persons. In the example illustrated in FIG. 8, each of regions of persons 21-1a, 22-1a, 23-1a, 24-1a, and 25-1a is detected from the image frame F21. Person IDs are assigned to the respective regions of the persons 21-1a, 22-1a, 23-1a, 24-1a, and 25-1a.

The detection unit 152 outputs information on the detection result to the attribute determination unit 153, the skeleton estimation unit 154, and the parameter optimization unit 155. The information on the detection result includes information on a region of a person (an image in the region), a person ID assigned to each region, a frame number of an image frame, and the like.

For each image frame of the video data 20 stored in the video buffer 141, the detection unit 152 repeatedly executes the above-described processing in time series.

The attribute determination unit 153 extracts a face image from the region of the person included in the information of the detection result, and inputs the face image to the attribute determination model 142b to determine the race and sex of the person. For the region of each person included in the information on the detection result, the attribute determination unit 153 determines the race and sex of the person. The attribute determination unit 153 generates attribute data in which a person ID is associated with the race and sex of the person, and outputs the attribute data to the parameter optimization unit 155.

Each time the attribute determination unit 153 acquires the information on the detection result from the detection unit 152, the attribute determination unit 153 repeatedly executes the above-described processing.

Figure 9:
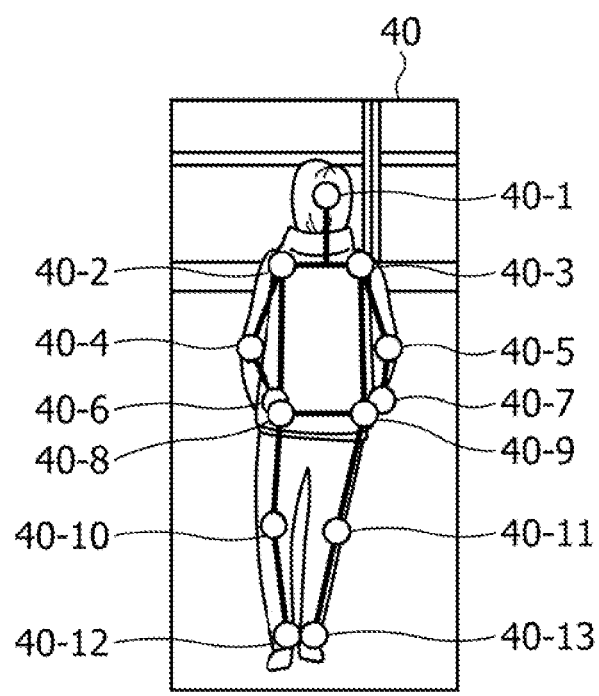
FIG. 9 is a diagram illustrating an example of a skeleton estimation result.

By inputting the information (whole body image) of the region of the person included in the information on the detection result to the skeleton estimation model 142c, the skeleton estimation unit 154 estimates a skeleton of the person. FIG. 9 is a diagram illustrating an example of a skeleton estimation result. As illustrated in FIG. 9, a skeleton estimation result 40 includes a plurality of joints 40-1, 40-2, 40-3, 40-4, 40-5, 40-6, 40-7, 40-8, 40-9, 40-10, 40-11, 40-12, and 40-13. Although not illustrated, each of the joints 40-1 to 40-13 includes coordinates in the image coordinate system and a type of the joint. For example, the joint 40-1 corresponds to a head. The joint 40-12 (40-13) corresponds to a foot.

For the region of each person included in the information on the detection result, the skeleton estimation unit 154 estimates the skeleton. The skeleton estimation unit 154 generates skeleton data in which a person ID and the skeleton estimation result of the person are associated with each other, and outputs the skeleton data to the parameter optimization unit 155, the evaluation unit 156, and the feature amount calculation unit 157.

Each time the skeleton estimation unit 154 acquires the information on the detection result from the detection unit 152, the skeleton estimation unit 154 repeatedly executes the above-described processing.

The parameter optimization unit 155 is a processing unit that optimizes camera parameters by executing the following processing. The processing of the parameter optimization unit 155 will be described by using FIG. 3. Based on the skeleton data, the parameter optimization unit 155 specifies coordinates $(x_{h1}, y_{h1})$ of the head and coordinates $(x_{f1}, y_{f1})$ of the foot of the person 21-1a.

Based on the attribute data, the parameter optimization unit 155 specifies the race and sex of the person 21-1a. By comparing the race and sex of the person 21-1a with the attribute table 143, the parameter optimization unit 155 specifies the average height and the variance for the race and sex corresponding to the person 21-1a. Based on the average height and the variance, the parameter optimization unit 155 randomly determines the height L to be assigned to the person 21-2a in the world coordinate system. For example, the parameter optimization unit 155 randomly determines the height L to be assigned to the person 21-2a by sampling a random number from the normal distribution having the specified average height and the variance.

The parameter optimization unit 155 sets initial values for the camera parameters. For example, the parameter optimization unit 155 sets c=300, θ=30, and f=500 as the initial values. A user may change the initial values by operating the input unit 120.

Based on the camera parameters, the parameter optimization unit 155 projects the coordinates $(x_{f1}, y_{f1})$ of the foot in the image coordinate system to coordinates in the world coordinate system. For example, the parameter optimization unit 155 calculates the intersection $(X_{f1}, Y_{f1}, Z_{f1})$ between the line segment l5 passing through the camera 10 and the coordinates $(x_{f1}, y_{f1})$ of the foot of the person 21-1a and the XZ plane of the world coordinate system, as the coordinates of the foot of the person 21-2a in the world coordinate system.

Based on the coordinates $(X_{f1}, Y_{f1}, Z_{f1})$ of the foot of the person 21-2a and the height L, the parameter optimization unit 155 calculates the coordinates $(X_{h1}, Y_{h1}, Z_{h1})$ of the head of the person 21-2a.

Based on the camera parameters of the camera 10, the parameter optimization unit 155 back-projects the coordinates $(X_{h1}, Y_{h1}, Z_{h1})$ of the head in the world coordinate system to the coordinates in the image coordinate system. For example, the parameter optimization unit 155 calculates the coordinates $(x'_{h1}, y'_{h1})$ of the intersection between a plane of the image coordinate system and the line segment 16 passing through the camera 10 and the coordinates $(X_{h1}, Y_{h1}, Z_{h1})$ of the head of the person 21-2a, and sets the calculated coordinates as the coordinates of the head of the person 21-1a in the image coordinate system.

The parameter optimization unit 155 sets a distance from the coordinates $(x_{f1}, y_{f1})$ of the foot to the coordinates $(x'_{h1}, y'_{h1})$ in the image coordinate system as the first feature amount. The parameter optimization unit 155 sets a distance from the coordinates $(x_{f1}, y_{f1})$ of the foot to the coordinates $(x_{h1}, y_{h1})$ of the head in the image coordinate system as the second feature amount.

By executing the above-described processing, the parameter optimization unit 155 also sets the first feature amount and the second feature amount for the persons 22-1a to 25-1a other than the person 21-1a included in the image frame F21 illustrated in FIG. 3.

Figure 10:
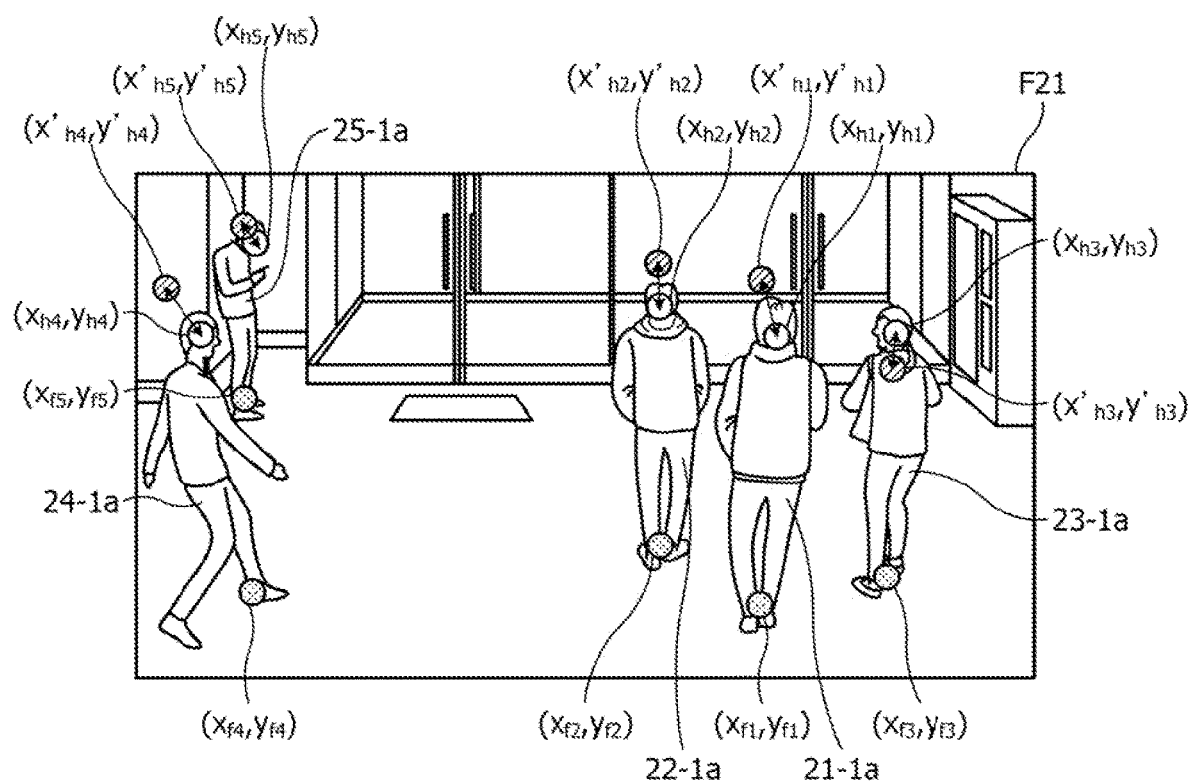
FIG. 10 is a diagram for describing processing of a parameter optimization unit.

FIG. 10 is a diagram for describing the processing of the parameter optimization unit. As described above, for the person 21-1a, the parameter optimization unit 155 specifies the coordinates $(x_{f1}, y_{f1})$ of the foot and the coordinates $(x_{h1}, y_{h1})$ of the head in the image coordinate system from the skeleton data corresponding to the person 21-1a. The parameter optimization unit 155 randomly assigns a height L1 according to the race and sex of the person 21-2a, and calculates the coordinates $(x'_{h1}, y'_{h1})$ based on the height L1. The height L assigned to the person 21-2a is referred to as the height L1 in order to be distinguished from heights assigned to other persons to be described later. The first feature amount of the person 21-1a is a distance from the coordinates $(x_{f1}, y_{f1})$ to the coordinates $(x'_{h1}, y'_{h1})$. The second feature amount of the person 21-1a is a distance from the coordinates $(x_{f1}, y_{f1})$ to the coordinates $(x_{h1}, y_{h1})$ of the head.

From the skeleton data corresponding to the person 22-1a, the parameter optimization unit 155 specifies coordinates (xf2, yf2) of the foot and coordinates (xh2, yh2) of the head in the image coordinate system. For convenience, a person in the world coordinate system corresponding to the person 22-1a is referred to as a person 22-2a. According to the race and sex of the person 22-2a, the parameter optimization unit 155 randomly assigns a height L2 and calculates coordinates (x'h2, y'h2). The first feature amount of the person 22-1a is a distance from the coordinates (xf2, yf2) to the coordinates (x'h2, y'h2). The second feature amount of the person 22-1a is a distance from the coordinates (xf2, yf2) to the coordinates (xh2, yh2) of the head. It should be noted that while the terms 'person 22-2a', 'height L2', 'person 23-2a', 'height L3', 'person 24-2a', 'height L4', 'person 25-2a', and 'height L5', which refer to persons and their parameters in the world coordinate system, are used for clarity in the description, they are not depicted in the drawings, which primarily illustrate the image coordinate system.

From the skeleton data corresponding to the person 23-1a, the parameter optimization unit 155 specifies coordinates $(x_{f3}, y_{f3})$ of the foot and coordinates $(x_{h3}, y_{h3})$ of the head in the image coordinate system. For convenience, a person in the world coordinate system corresponding to the person 23-1a is referred to as a person 23-2a. According to the race and sex of the person 23-2a, the parameter optimization unit 155 randomly assigns a height L3 and calculates coordinates $(x'_{h3}, y'_{h3})$. The first feature amount of the person 23-1a is a distance from the coordinates $(x_{f3}, y_{f3})$ to the coordinates $(x'_{h3}, y'_{h3})$. The second feature amount of the person 23-1a is a distance from the coordinates $(x_{f3}, y_{f3})$ to the coordinates $(x_{h3}, y_{h3})$ of the head.

From the skeleton data corresponding to the person 24-1a, the parameter optimization unit 155 specifies coordinates $(x_{f4}, y_{f4})$ of the foot and coordinates $(x_{h4}, y_{h4})$ of the head in the image coordinate system. For convenience, a person in the world coordinate system corresponding to the person 24-1a is referred to as a person 24-2a. According to the race and sex of the person 24-2a, the parameter optimization unit 155 randomly assigns a height L4 and calculates coordinates $(x'_{h4}, y'_{h4})$. The first feature amount of the person 24-1a is a distance from the coordinates $(x_{f4}, y_{f4})$ to the coordinates $(x'_{h4}, y'_{h4})$. The second feature amount of the person 24-1a is a distance from the coordinates $(x_{f4}, y_{f4})$ to the coordinates $(x_{h4}, y_{h4})$ of the head.

From the skeleton data corresponding to the person 25-1a, the parameter optimization unit 155 specifies coordinates $(x_{f5}, y_{f5})$ of the foot and coordinates $(x_{h5}, y_{h5})$ of the head in the image coordinate system. For convenience, a person in the world coordinate system corresponding to the person 25-1a is referred to as a person 25-2a. According to the race and sex of the person 25-2a, the parameter optimization unit 155 randomly assigns a height L5 and calculates coordinates $(x'_{h5}, y'_{h5})$. The first feature amount of the person 25-1a is a distance from the coordinates $(x_{f5}, y_{f5})$ to the coordinates $(x'_{h5}, Y'_{h5})$ The second feature amount of the person 25-1a is a distance from the coordinates $(x_{f5}, y_{f5})$ to the coordinates $(x_{h5}, Y_{h5})$ of the head.

Hereinafter, a difference between the first feature amount and the second feature amount of the person 21-1a is referred to as a "difference between the feature amounts of the person 21-1a". A difference between the first feature amount and the second feature amount of the person 22-1a is referred to as a "difference between the feature amounts of the person 22-1a". A difference between the first feature amount and the second feature amount of the person 23-1a is referred to as a "difference between the feature amounts of the person 23-1a".

A difference between the first feature amount and the second feature amount of the person 24-1a is referred to as a "difference between the feature amounts of the person 24-1a". A difference between the first feature amount and the second feature amount of the person 25-1a is referred to as a "difference between the feature amounts of the person 25-1a".

The parameter optimization unit 155 optimizes the camera parameters so that the differences between the feature amounts of the persons 21-1a to 25-1a decrease in a state in which the heights L1 to L5 assigned to the respective persons 21-1a to 25-1a are fixed. The parameter optimization unit 155 registers the heights L1 to L5 assigned to the respective persons 21-1a to 25-1a and information on the optimized camera parameters as a record with the number of executions "1" in the evaluation table 144.

The parameter optimization unit 155 reassigns the heights L1 to L5 assigned to the respective persons 21-1a to 25-1a and resets the camera parameters to the initial values. The parameter optimization unit 155 optimizes the camera parameters so that the differences between the feature amounts of the persons 21-1*a* to 25-1*a* decrease. The parameter optimization unit 155 registers the heights L1 to L5 assigned to the respective persons 21-1*a* to 25-1*a* and information on the optimized camera parameters as a record with the number of executions "2" in the evaluation table 144. By repeatedly executing the above-described processing, the parameter optimization unit 155 registers the record of each number of executions in the evaluation table 144. The value input as the evaluation value of the evaluation table 144 is calculated by the evaluation unit 156 described later.

Figure 11:
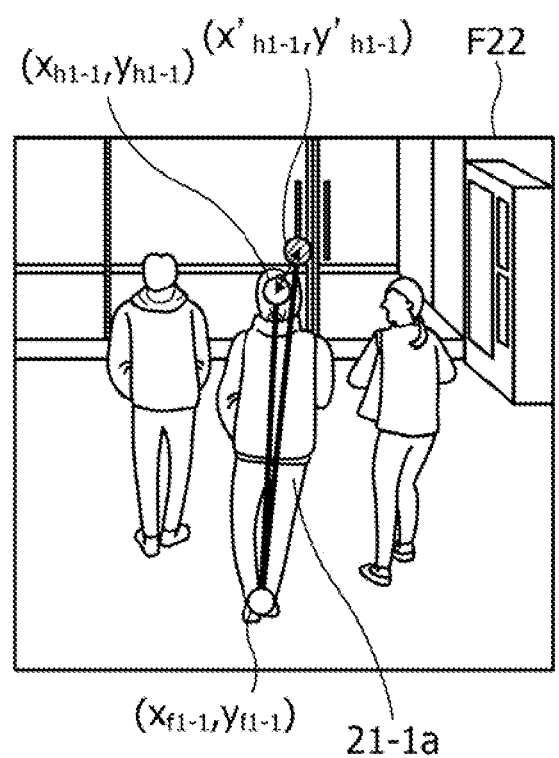
FIG. 11 is a diagram for describing processing of an evaluation unit.

The description returns to FIG. 4. The evaluation unit 156 evaluates the individual camera parameters corresponding to each number of executions registered in the evaluation table 144. FIG. 11 is a diagram for describing the processing of the evaluation unit. FIG. 11 describes the processing of the evaluation unit 156 by using the person 21-1*a* included in an image frame F22. The image frame F22 is the next image frame of the image frame F21 described in FIG. 3 and the like.

A case where the evaluation unit 156 calculates an evaluation value of the camera parameters for which the number of executions is "1" will be described. Based on the record corresponding to the number of executions "1" in the evaluation table 144, the evaluation unit 156 acquires the height L1 randomly assigned to the person 21-1*a* and the camera parameters.

Based on the skeleton data estimated from the image frame F22, the evaluation unit 156 specifies coordinates $(x_{h1-1}, y_{h1-1})$ of the head and coordinates $(x_{f1-1}, y_{f1-1})$ of the foot of the person 21-1*a*. By using the height L1 and the camera parameters acquired from the evaluation table 144, the evaluation unit 156 specifies coordinates $(x'_{h1-1}, y'_{h1-1})$ of the head by projection to the world coordinate system and back projection from the world coordinate system in the same manner as the parameter optimization unit 155.

The evaluation unit 156 calculates a difference between a distance from the coordinates $(x_{f1-1}, y_{f1-1})$ of the foot to the coordinates $(x'_{h1-1}, y'_{h1-1})$ and a distance from the coordinates $(x_{f1-1}, y_{f1-1})$ to the coordinates $(x_{h1-1}, y_{h1-1})$ of the head in the image coordinate system.

By repeatedly executing the above-described processing for the image frames F23 to F23+M (M is a predetermined natural number), the evaluation unit 156 calculates the difference related to the person 21-1*a*. The evaluation unit 156 calculates a variance based on each of the calculated differences as a variance related to the person 21-1*a*. If the camera parameters are appropriate, the difference calculated from each image frame is fixed, and the variance becomes small.

As for the other persons 22-1*a* to 25-1*a*, the evaluation unit 156 calculates variances in the same manner as the manner for the person 21-1*a*. The evaluation unit 156 calculates total values of the variances related to the persons 21-1*a* to 25-1*a* as an evaluation value of the camera parameters for which the number of executions is "1", and registers the evaluation value in the evaluation table 144.

Similarly, the evaluation unit 156 calculates evaluation value of the camera parameters for another number of executions and registers the evaluation value in the evaluation table 144. Among the plurality of camera parameters registered in the evaluation table 144, the camera parameters of which the evaluation value is minimized are optimal camera parameters to be finally determined. Because the evaluation value of the camera parameters corresponding to the number of executions "2" is minimized in the example illustrated in FIG. 7, the camera parameters (c=300, θ=25, f=540) corresponding to the number of executions "2" are the camera parameters to be finally specified.

The evaluation unit 156 outputs the camera parameters of which the evaluation value is minimized to the feature amount calculation unit 157.

Based on the camera parameters acquired from the evaluation unit 156, the feature amount calculation unit 157 calculates a height of the person included in the image frame. Based on the skeleton data, the feature amount calculation unit 157 specifies the coordinates of the head and the coordinates of the foot of the person in the image coordinate system. Based on the camera parameters, the feature amount calculation unit 157 projects the coordinates of the head and the coordinates of the foot of the person in the image coordinate system to the coordinates of the head and the coordinates of the foot of the person in the world coordinate system. The feature amount calculation unit 157 calculates a distance from the coordinates of the foot to the coordinates of the head in the world coordinate system as the height of the person. The feature amount calculation unit 157 may display information on the calculated feature amount (height) of the person on the display unit 130 or may transmit the information to an external device.

Based on the skeleton data and the camera parameters, the feature amount calculation unit 157 may calculate a length or the like of a predetermined part of the person as the feature amount of the person.

Figure 12:
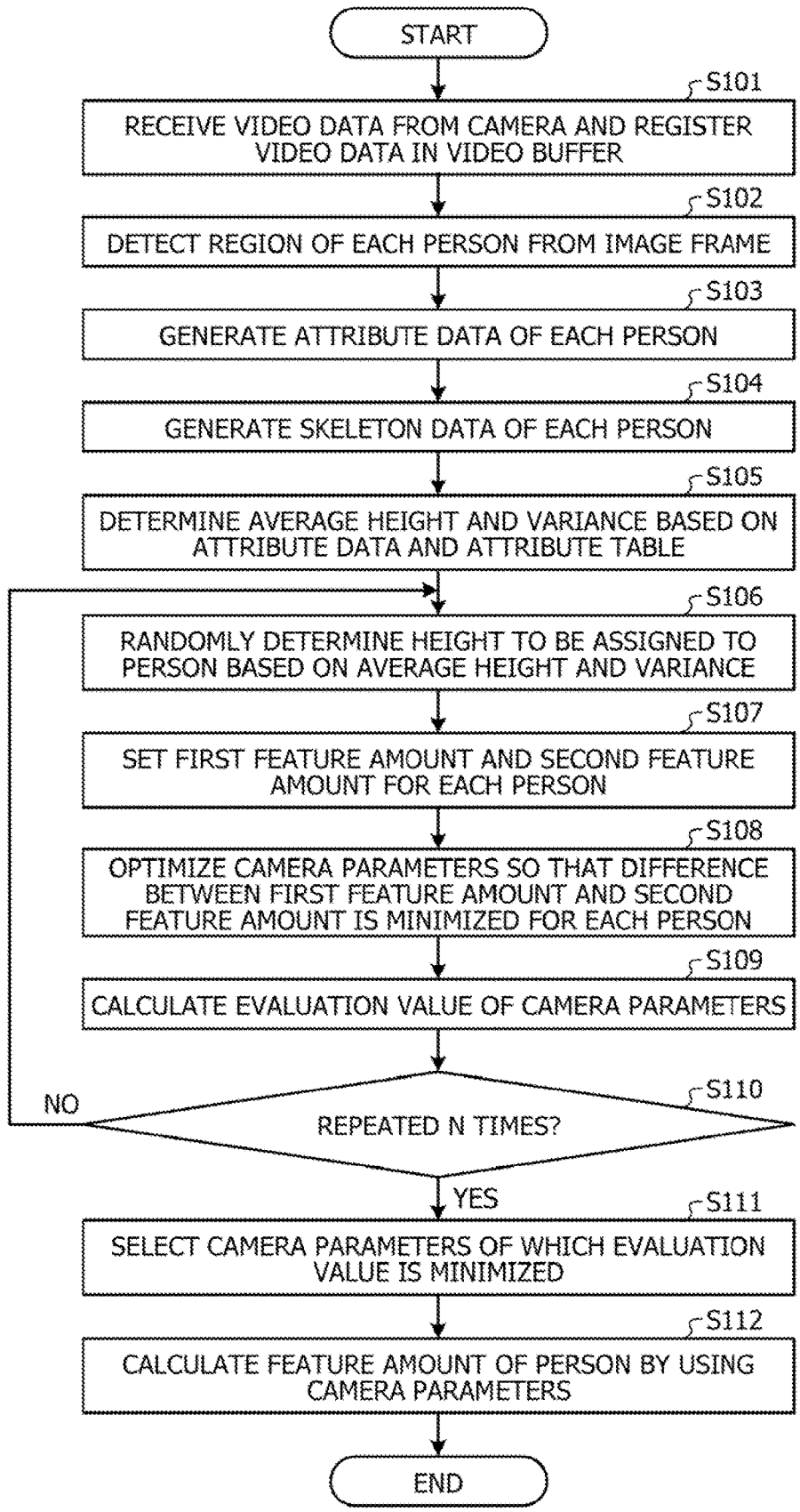
FIG. 12 is a flowchart illustrating a processing procedure of the information processing apparatus according to the first embodiment.

Next, an example of a processing procedure of the information processing apparatus according to the present embodiment will be described. FIG. 12 is a flowchart illustrating a processing procedure of the information processing apparatus according to the present embodiment. The acquisition unit 151 of the information processing apparatus 100 receives video data from the camera 10 and registers the video data in the video buffer 141 (step S101).

The detection unit 152 of the information processing apparatus 100 detects a region of each person from an image frame (step S102). The attribute determination unit 153 of the information processing apparatus 100 generates attribute data of each person (step S103). The skeleton estimation unit 154 of the information processing apparatus 100 generates skeleton data of each person (step S104).

Based on the attribute data and the attribute table 143, the parameter optimization unit 155 of the information processing apparatus 100 specifies an average height and a variance (step S105). Based on the average height and the variance, the parameter optimization unit 155 randomly determines a height to be assigned to the person (step S106).

For each person, the parameter optimization unit 155 sets the first feature amount and the second feature amount (step S107). For each person, the parameter optimization unit 155 optimizes the camera parameters so that a difference between the first feature amount and the second feature amount is minimized (step S108).

The evaluation unit 156 of the information processing apparatus 100 calculates an evaluation value of the camera parameters (step S109). When the processing of calculating the camera parameters is not repeated N times (No in step S110), the information processing apparatus 100 proceeds to step S106. On the other hand, when the processing of calculating the camera parameters is repeated N times (Yes in step S110), the information processing apparatus 100 proceeds to step S111.

The evaluation unit 156 selects the camera parameters of which the evaluation value is minimized (step S111). By using the selected camera parameters, the feature amount calculation unit 157 of the information processing apparatus 100 calculates a feature amount of the person (step S112).

Next, an effect of the information processing apparatus 100 according to the present embodiment will be described. The information processing apparatus 100 randomly assigns a temporary height L from the attribute data of the person, and calculates the first feature amount of the person in the image calculated from the temporary height and the second feature amount of the person in the image calculated from skeleton data. The information processing apparatus 100 estimates camera parameters so that an error between the first feature amount and the second feature amount is minimized, and calculates the feature amount of the person. Accordingly, even when the height of the person is unknown, the camera parameters may be estimated, and an accuracy of the feature amount such as the height of the person may be improved by using such camera parameters.

Based on the average height and the variance corresponding to the race and sex of the person, the information processing apparatus 100 assigns the random temporary height to the person and specifies the first feature amount of the person in the image calculated from the temporary height. Accordingly, even when the height of the person is unknown, a likely height may be set in accordance with the race and sex, and the first feature amount may be specified.

The information processing apparatus 100 calculates each evaluation value of the camera parameters, and selects the camera parameters of which the evaluation value is minimized as the final camera parameters. Accordingly, the estimation accuracy of the camera parameters may be further improved.

Figure 13:
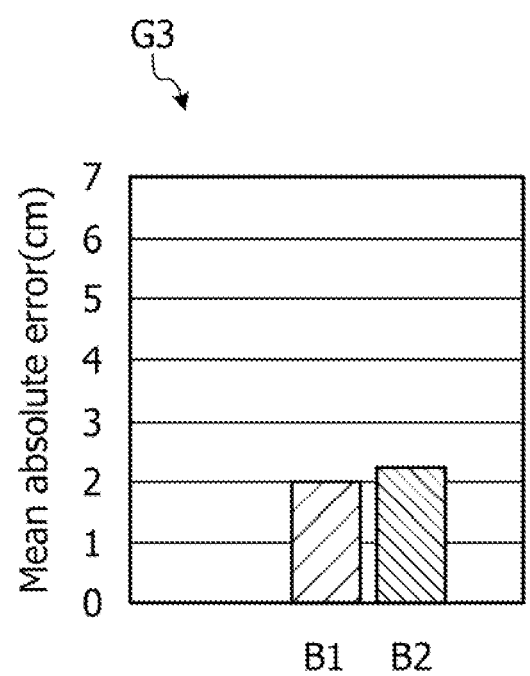
FIG. 13 is a diagram for describing an effect of the information processing apparatus according to the first embodiment.

FIG. 13 is a diagram for describing an effect of the information processing apparatus according to the present embodiment. A vertical axis of a bar graph G3 in FIG. 13 indicates a magnitude of an error (mean absolute error). A bar B1 indicates an error in a case where a height of a person is calculated by estimating camera parameters by using a known height. A bar B2 indicates an error in the height of the person calculated by the information processing apparatus 100. Both in the bar B1 and the bar B2, the errors are around 2 cm, and it may be confirmed that the accuracy equivalent to the accuracy in a case where the height is known is reached by using the information processing apparatus 100.

Figure 14:
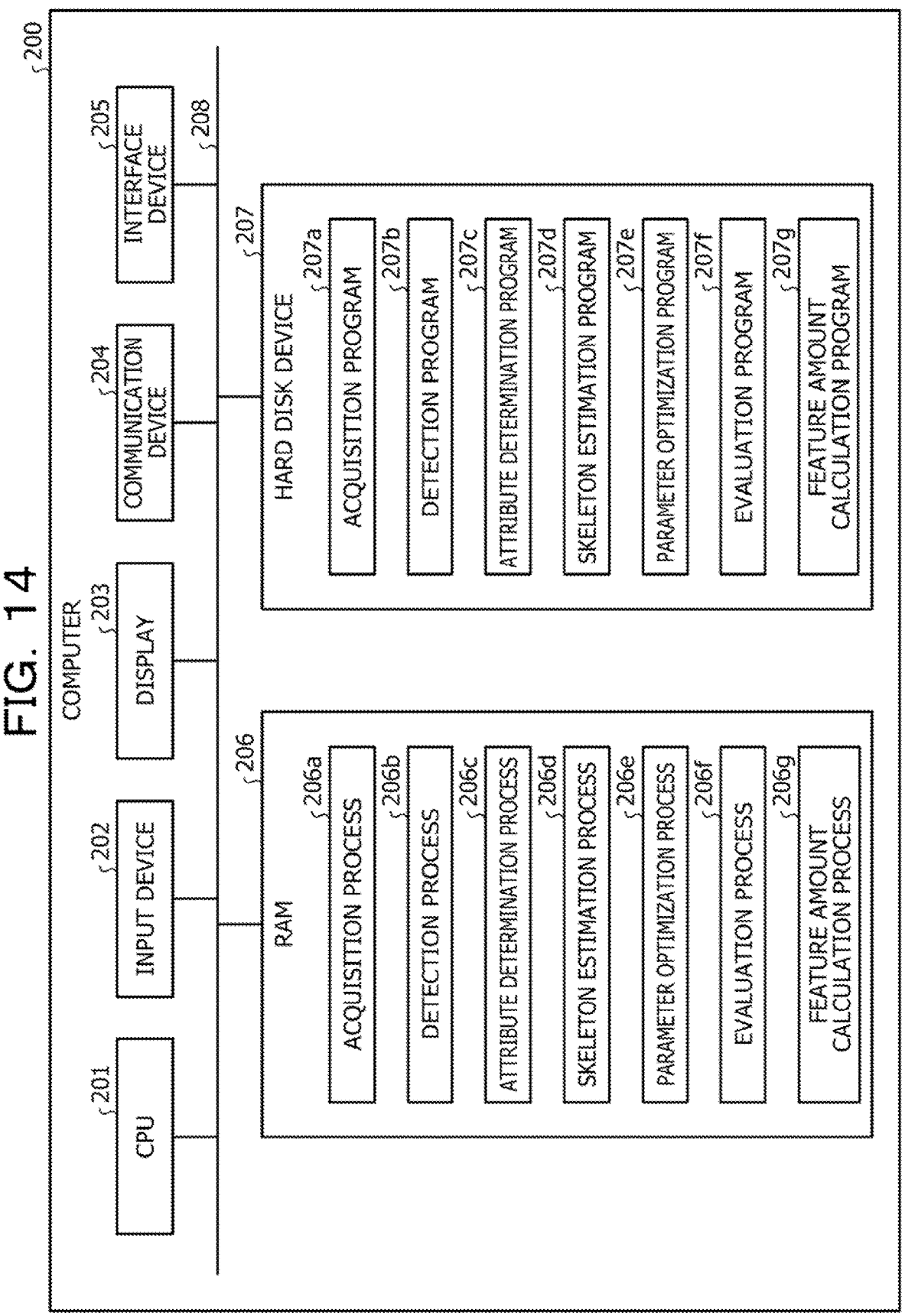
FIG. 14 is a diagram illustrating an example of a hardware configuration of a computer that implements functions similar to those of the information processing apparatus according to the embodiment.

Next, an example of a hardware configuration of a computer that implements functions similar to those of the information processing apparatus 100 described in the above embodiment will be described. FIG. 14 is a diagram illustrating an example of a hardware configuration of a computer that implements functions similar to those of the information processing apparatus according to the embodiment.

As illustrated in FIG. 14, a computer 200 includes a CPU 201 that executes various kinds of arithmetic processing, an input device 202 that receives input of data from a user, and a display 203. The computer 200 also includes a communication device 204 that exchanges data with the camera 10, an external device, and the like via a wired or wireless network, and an interface device 205. The computer 200 also includes a RAM 206 that temporarily stores various kinds of information, and a hard disk device 207. Each of the devices 201 to 207 is coupled to a bus 208.

The hard disk device 207 includes an acquisition program 207a, a detection program 207b, an attribute determination program 207c, a skeleton estimation program 207d, a parameter optimization program 207e, an evaluation program 207f, and a feature amount calculation program 207g. The CPU 201 reads each of the programs 207a to 207g and loads the programs into the RAM 206.

The acquisition program 207a functions as an acquisition process 206a. The detection program 207b functions as a detection process 206b. The attribute determination program 207c functions as an attribute determination process 206c. The skeleton estimation program 207d functions as a skeleton estimation process 206d. The parameter optimization program 207e functions as a parameter optimization process 206e. The evaluation program 207f functions as an evaluation process 206f. The feature amount calculation program 207g functions as a feature amount calculation process 206g.

Processing of the acquisition process 206a corresponds to the processing of the acquisition unit 151. Processing of the detection process 206b corresponds to the processing of the detection unit 152. Processing of the attribute determination process 206c corresponds to the processing of the attribute determination unit 153. Processing of the skeleton estimation process 206d corresponds to the processing of the skeleton estimation unit 154. Processing of the parameter optimization process 206e corresponds to the processing of the parameter optimization unit 155. Processing of the evaluation process 206f corresponds to the processing of the evaluation unit 156. Processing of the feature amount calculation process 206g corresponds to the processing of the feature amount calculation unit 157.

Each of the programs 207a to 207g may not be stored in the hard disk device 207 from the beginning. For example, each of the programs 207a to 207g may be stored in a "portable physical medium", such as a flexible disk (FD), a compact disc read-only memory (CD-ROM), a Digital Versatile Disc (DVD), a magneto-optical disk, or an integrated circuit (IC) card, to be inserted into the computer 200. The computer 200 may read and execute each of the programs 207a to 207g.

Second Embodiment

Before describing a second embodiment, a point to be improved in the first embodiment described above will be described. In the first embodiment, unknown camera parameters are estimated for a moving person who is imaged in video data. In the first embodiment, in a case where only video data obtained by capturing an image of a person moving in a narrow depth range may be acquired, an amount of person size information which may be acquired at the time of the camera parameter optimization decreases. As the amount of person size information decreases, the constraint at the time of estimation may not be increased, and the estimation accuracy of the camera parameters may decrease.

Hereinafter, video data obtained by capturing an image of a person moving in a wide depth range is appropriately referred to as video data having a large amount of person size information. On the other hand, video data obtained by capturing an image of a person moving in a narrow depth range is referred to as video data having a small amount of person size information.

Figure 15:
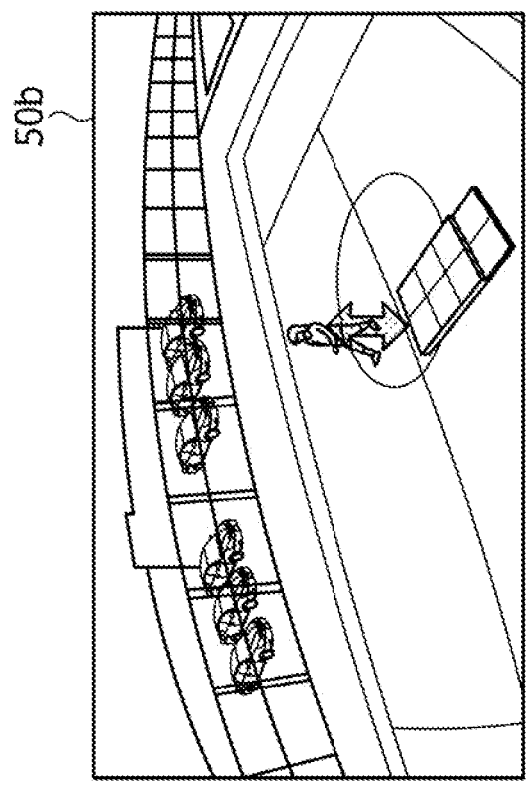
FIG. 15 is a diagram illustrating video data having a large amount of person size information and video data having a small amount of person size information.
Figure 15:
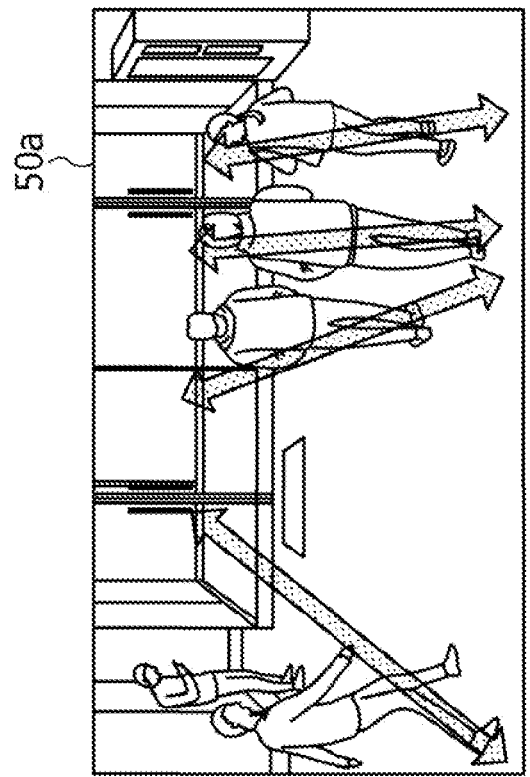

FIG. 15 is a diagram illustrating the video data having the large amount of person size information and the video data having the small amount of person size information. In video data 50a illustrated in FIG. 15, persons exist on a near side and a far side of the video data 50a, a depth range where the persons exist is wide, and thus the amount of person size information is large. On the other hand, in video data 50b, a person exists in the vicinity of a center, the depth range where the person exists is narrow, and thus the amount of person size information is small.

Figure 16:
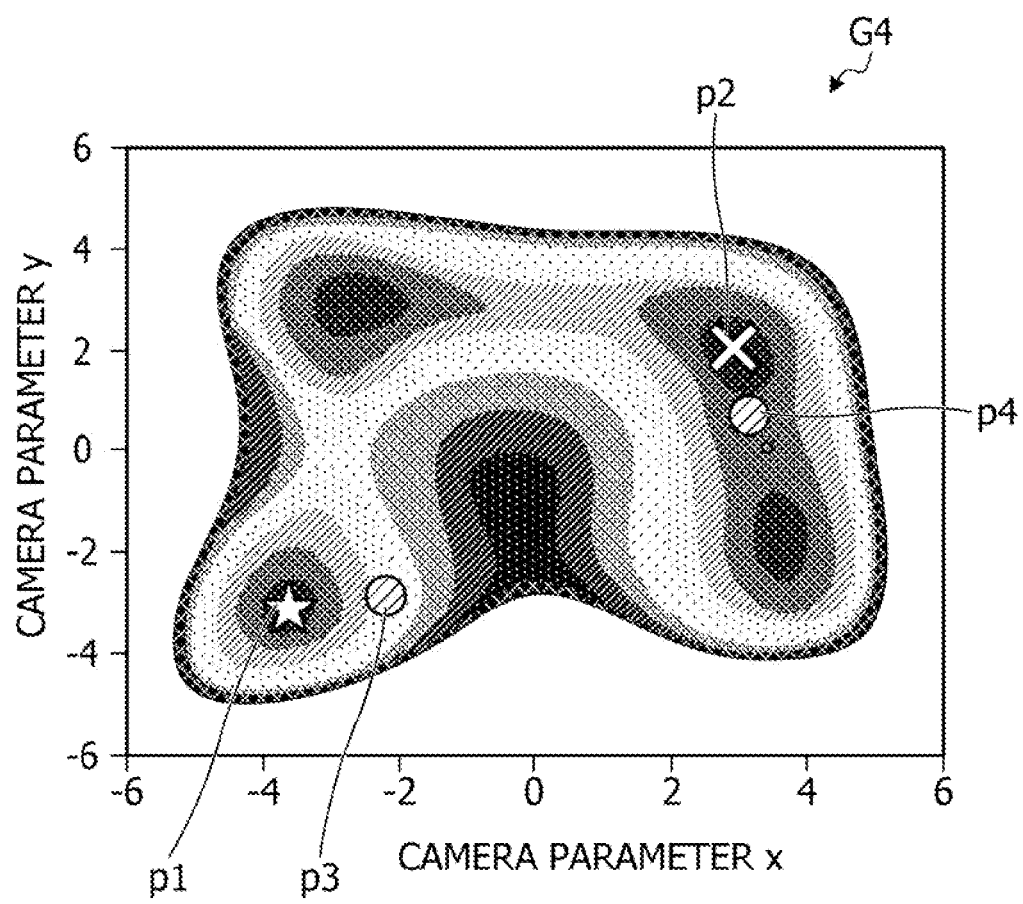
FIG. 16 is a diagram for describing a point to be improved in the first embodiment.

FIG. 16 is a diagram for describing a point to be improved in the first embodiment. In a graph G4 in FIG. 16, it is assumed that a horizontal axis is an axis corresponding to a certain camera parameter x, and a vertical axis is an axis corresponding to a certain camera parameter y. For example, it is assumed that a position of an optimal solution of the camera parameters in the graph G4 is p1. It is assumed that a position of a certain local solution of the camera parameters in the graph G4 is p2.

When the information processing apparatus 100 according to the first embodiment estimates the camera parameters by using the video data 50a, the position of the estimated value in the graph G4 becomes p3. Thus, a value close to the optimal solution may be obtained. By contrast, when the information processing apparatus 100 estimates the camera parameters by using the video data 50b, the position of the estimated value in the graph G4 becomes p4. Thus, the estimated value is closer to the local solution than the optimal solution.

As described above, in the first embodiment, in a case where it is not possible to acquire the video data having the large amount of person size information, the estimation accuracy of the parameters decreases.

Next, the information processing apparatus according to the second embodiment will be described. The information processing apparatus according to the second embodiment virtually moves a person included in the video data to increase the amount of person size information included in the video data and improve the estimation accuracy of the camera parameters.

Figure 17:
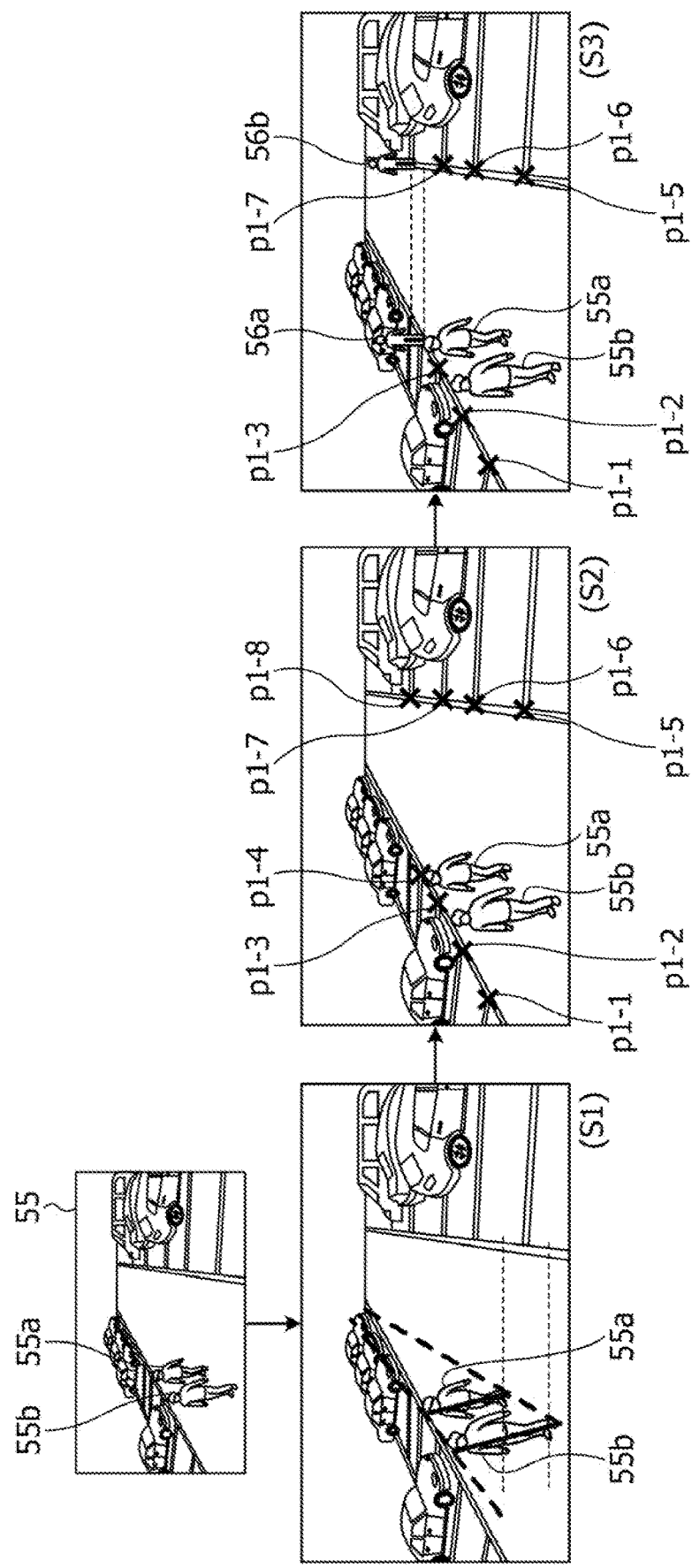
FIG. 17 is a diagram for describing processing of an information processing apparatus according to a second embodiment.

FIG. 17 is a diagram for describing processing of the information processing apparatus according to the second embodiment. For example, the information processing apparatus acquires video data 55 and executes processing in steps S1, S2, and S3. It is assumed that one person is imaged in the video data 55. The video data 55 includes time-series image frames. For convenience, FIG. 17 illustrates the same person at different times. A person 55a indicates a person in the image frame at time t, and a person 55b indicates a person in the image frame at time t+1.

Step S1 in FIG. 17 will be described. The information processing apparatus estimates a depth reduction rate of a person size in step S1. The information processing apparatus estimates the depth reduction rate based on a change in a size of the person 55a and a size of the person 55b and a change in a y coordinate of the person 55a and a y coordinate of the person 55b.

Step S2 in FIG. 17 will be described. The information processing apparatus analyzes the video data 55 and extracts candidate points over a ground in step S2. An example illustrated in FIG. 17 indicates a case where the information processing apparatus extracts candidate points p1-1, p1-2, p1-3, p1-4, p1-5, p1-6, p1-7, and p1-8 over the ground.

Step S3 in FIG. 17 will be described. The information processing apparatus specifies a candidate point for disposing a virtual person from candidate points p1-1 to p1-8 over the ground. In the example illustrated in FIG. 17, a case where the information processing apparatus disposes virtual persons 56a and 56b at the candidate points p1-4 and p1-8 will be described. Based on the size of the person 55a and the depth reduction rate obtained in step S1, the information processing apparatus calculates a size of the virtual person 56a disposed at the candidate point p1-4. Based on the size of the person 55a and the depth reduction rate obtained in step S1, the information processing apparatus calculates a size of the virtual person 56b disposed at the candidate point p1-8. The information processing apparatus disposes the virtual persons 56a and 56b having the calculated sizes at the candidate points p1-4 and p1-8.

The information processing apparatus estimates the camera parameters based on the persons 55a and 55b and the virtual persons 56a and 56b. By using the information of the virtual persons 56a and 56b in addition to the information of the persons 55a and 55b, it is possible to increase the amount of person size information and make a solution of the camera parameters less likely to fall into the local solution.

Subsequently, an example of processing of calculating the depth reduction rate described in step S1 in FIG. 17 will be described. Based on the video data, the information processing apparatus determines whether there is a movement, in a depth direction, of a person imaged in the video data. For example, the information processing apparatus detects a region of the person from each image frame included in the video data, and specifies a y coordinate of a foot of the person. The information processing apparatus determines that there is a movement, in a depth direction, of the person imaged in video data when a change amount of the y coordinate per predetermined time is equal to or greater than a threshold. By contrast, when the change amount of the y coordinate per the predetermined time is less than the threshold, the information processing apparatus determines that there is no movement, in the depth direction, of the person imaged in the video data.

Figure 18:
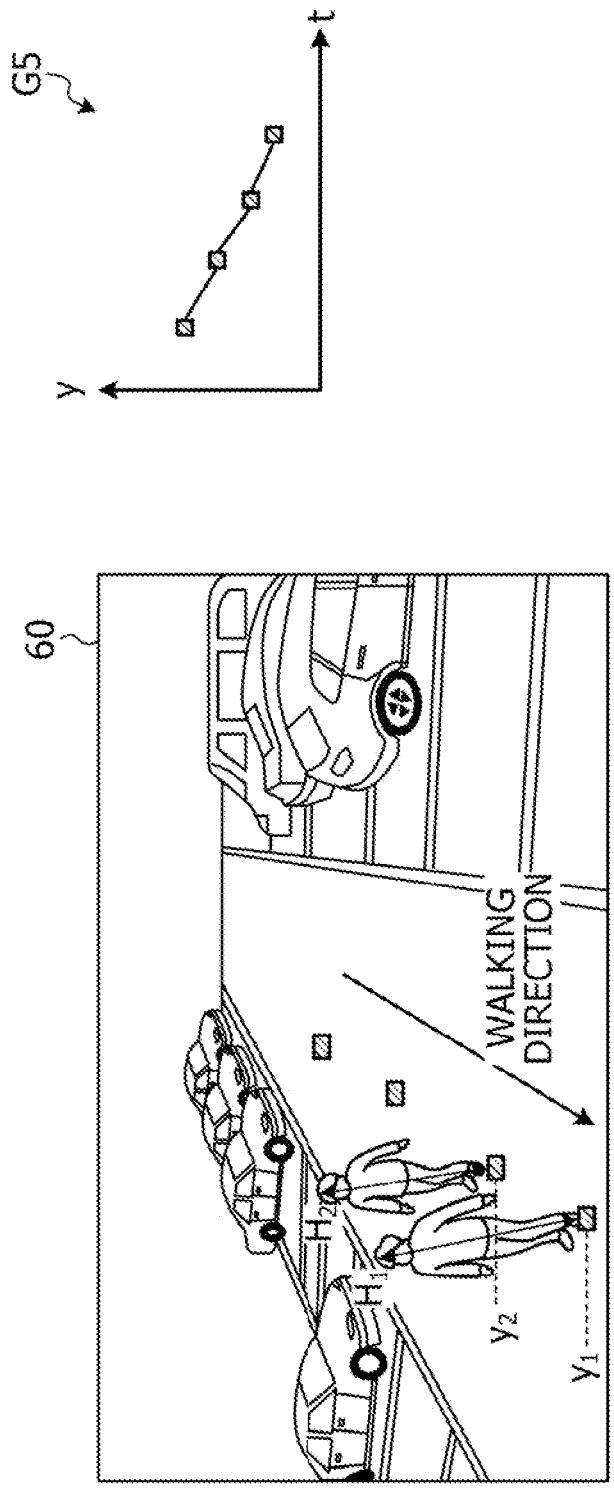
FIG. 18 is a diagram (1) for describing processing of calculating a depth reduction rate.

FIG. 18 is a diagram (1) for describing the processing of calculating the depth reduction rate. A horizontal axis of a graph G5 in FIG. 18 is an axis corresponding to time, and a vertical axis is an axis corresponding to a y coordinate of a foot of a person included in video data 60 in FIG. 18. Assuming that the change amount of the y coordinate per predetermined time is equal to or greater than the threshold in the graph G5, the information processing apparatus determines that there is a movement, in the depth direction, in the person imaged in the video data 60. The information processing apparatus calculates the depth reduction rate based on skeleton data of the person at each time when there is the movement, in the depth direction, of the person imaged in the video data 60.

As an example illustrated in FIG. 18, a walking direction of the person is set as a direction from the far side to the near side of the video data 60. The y coordinate of the foot of the person at time $t_1$ is set as $y_1$. The y coordinate of the foot of the person at time $t_2$ is set as $y_2$. The height obtained from the skeleton data of the person at time $t_1$ is set as $H_1$. The height obtained from the skeleton data of the person at time $t_2$ is set as $H_2$. The information processing apparatus calculates a depth reduction rate α based on Expression (1).

$$\text{Depth reduction rate } \alpha = -(H_2 - H_1)/(y_2 - y_1) \qquad (1)$$

Figure 19:
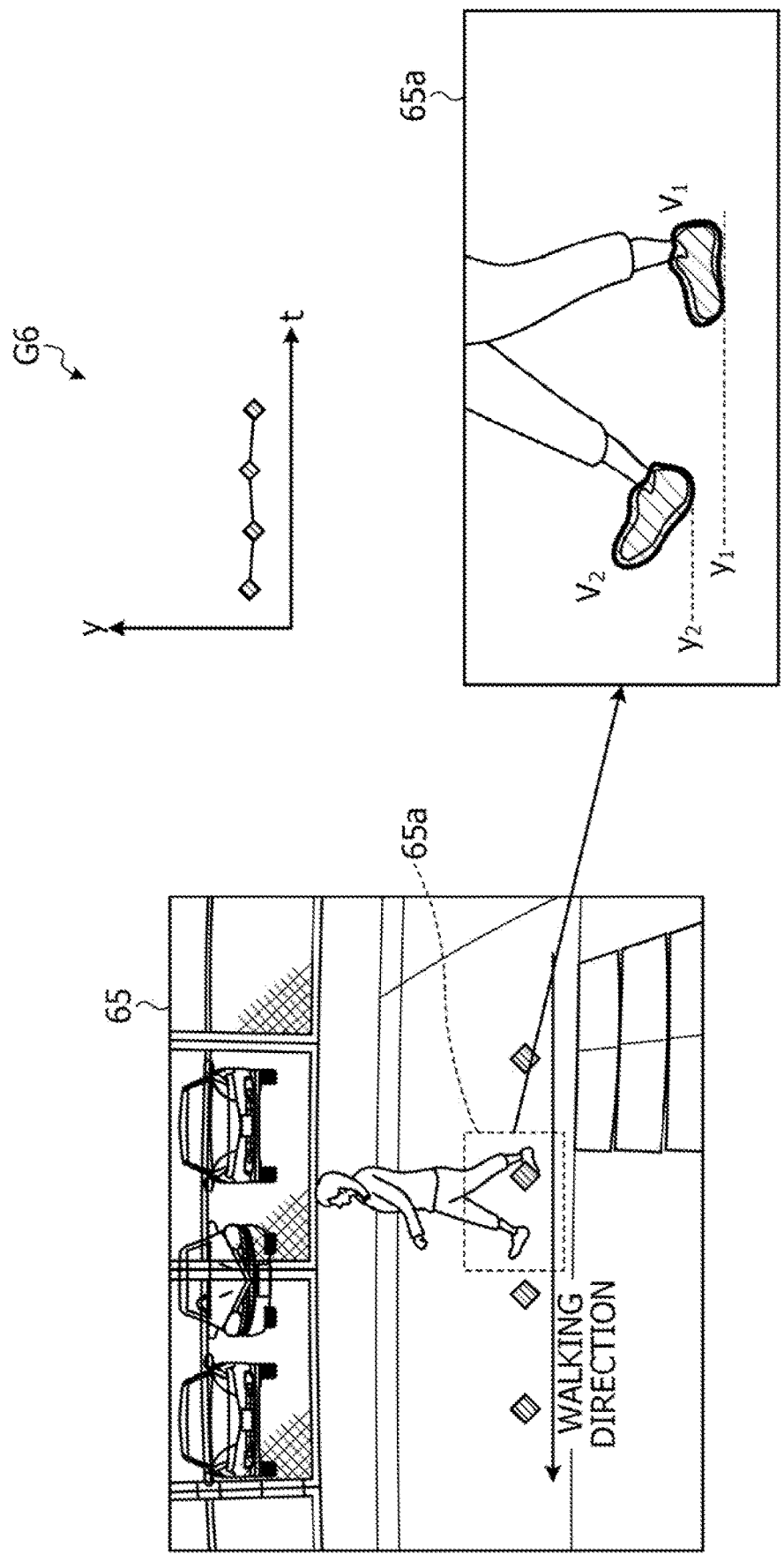
FIG. 19 is a diagram (2) for describing processing of calculating a depth reduction rate.

FIG. 19 is a diagram (2) for describing the processing for calculating the depth reduction rate. A horizontal axis of a graph G6 in FIG. 19 is an axis corresponding to time, and a vertical axis is an axis corresponding to a y coordinate of a foot of a person included in video data 65 in FIG. 19. Assuming that the change amount of the y coordinate per predetermined time is less than the threshold in the graph G6, the information processing apparatus determines that there is no movement, in the depth direction, of the person imaged in the video data 65. The information processing apparatus calculates the depth reduction rate by comparing regions of a human body part of the person at a certain time when there is no movement, in the depth direction, of the person imaged in the video data 65.

As an example in FIG. 19, a walking direction of the person is set as a direction from a right side to a left side of the video data 65. In the second embodiment, the region of the human body part to be compared is set as a region of a foot portion. Hereinafter, the region of the foot portion is referred to as a "foot region". In a region 65a of the video data 65, it is assumed that a left foot region of the person is $V_1$, and a right foot region is $V_2$. It is assumed that a y coordinate of a portion where the left foot region $V_1$ is in contact with the ground is $y_1$. It is assumed that a y coordinate of a portion where the right foot region $V_2$ is in contact with the ground is $y_2$. The information processing apparatus calculates a depth reduction rate α based on Expression (2). For example, the foot region $V_1$ is an area of a left shoe. The foot region $V_2$ is an area of a right shoe.

$$\text{Depth reduction rate } \alpha = -(V_2 - V_1)/(y_2 - y_1) \quad (2)$$

The processing of extracting the candidate point over the ground described in step S2 in FIG. 17 will be described. The information processing apparatus 100 executes semantic segmentation on the video data and assigns labels to all the pixels in the image frame. The label includes information for identifying a pixel and an object such as the ground. The information processing apparatus refers to a label assignment result and specifies the pixel to which the label corresponding to the ground is assigned, as the region of the ground.

The information processing apparatus may input the video data to a learning model such as You Look Only Once (YOLO) to determine a scene of the video data. For example, when the scene of the video data is a parking lot, the information processing apparatus detects straight line components included in the image frame and specifies an intersection of the detected straight line components as a candidate point. In the example described in FIG. 17, the information processing apparatus detects the candidate points p1-1 to p1-8 corresponding to the intersections of the straight line components.

The information processing apparatus may input the video data to a learning model such as YOLO, determine the scene of the video data, and when the scene of the video data is not a specific scene such as the parking lot, set a predetermined number of candidate points for the region of the ground at predetermined intervals. It is assumed that the number of candidate points to be set is set in advance.

Figure 20:
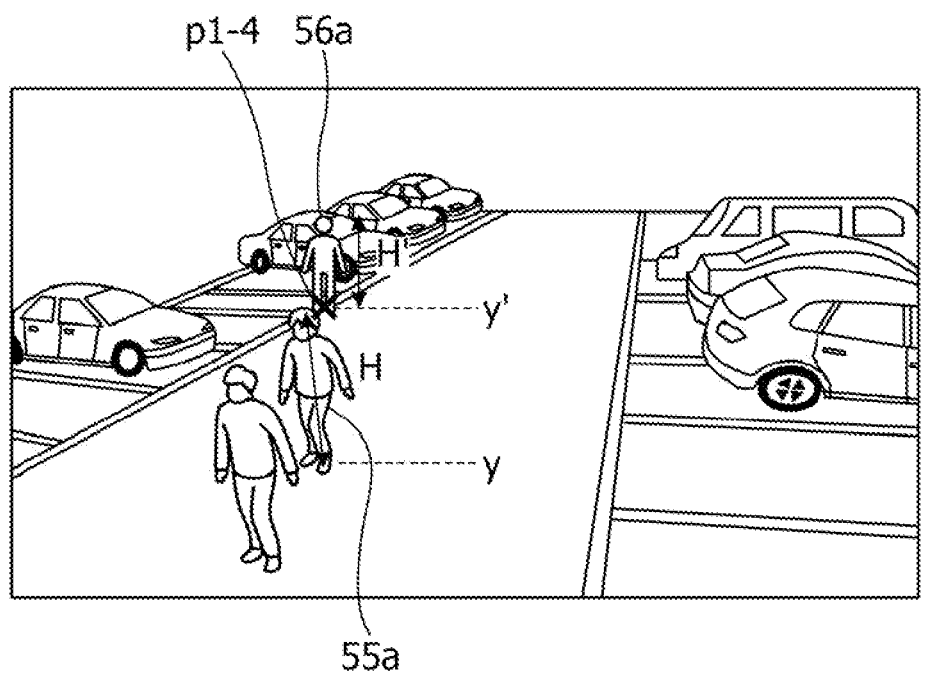
FIG. 20 is a diagram for describing processing of disposing a virtual person.

Subsequently, the processing of disposing a virtual person described in step S3 in FIG. 17 will be described. FIG. 20 is a diagram for describing the processing of disposing a virtual person. The information processing apparatus determines a disposition point from the candidate points p1-1 to p1-8 obtained in step S2. For example, the information processing apparatus preferentially determines a candidate point on the far side of the position where the person exists as the disposition point. As an example, the disposition point is set to the candidate point p1-4 in FIG. 20.

The information processing apparatus calculates a y coordinate of a foot of skeleton data of the person 55a at certain time t and a y' coordinate of the disposition point (candidate point p1-4) at which the virtual person 56a is disposed. Based on Expression (3), the information processing apparatus calculates a height H' of the virtual person 56a. α is the depth reduction rate obtained in step S1. It is noted that a value (y'−y) in Expression (3) corresponds to a height H of the person 55a.

$$\text{Height } H' \text{ of virtual person} = \alpha(y' - y) \quad (3)$$

After calculating the height H' of the virtual person 56a, the information processing apparatus adjusts the size of the skeleton data of the virtual person 56a based on the height H' and disposes the virtual person 56a at the disposition point (candidate point p1-4).

Figure 21:
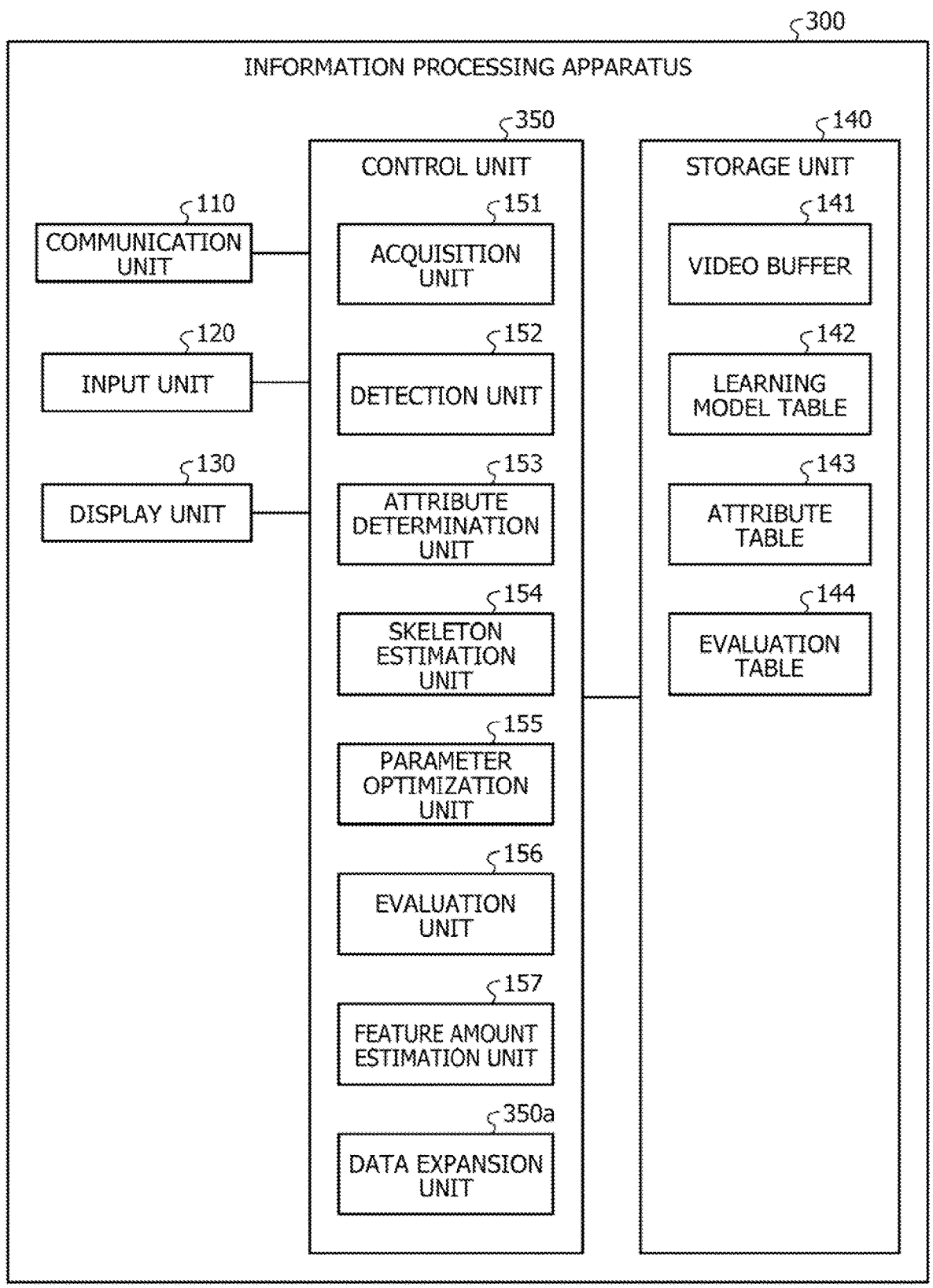
FIG. 21 is a functional block diagram illustrating a configuration of the information processing apparatus according to the second embodiment.

Next, a configuration example of the information processing apparatus according to the second embodiment is described. FIG. 21 is a functional block diagram illustrating a configuration of the information processing apparatus according to the second embodiment. As illustrated in FIG. 21, an information processing apparatus 300 includes the communication unit 110, the input unit 120, the display unit 130, the storage unit 140, and a control unit 350.

Descriptions related to the communication unit 110, the input unit 120, the display unit 130, and the storage unit 140 are the same as the descriptions related to the communication unit 110, the input unit 120, the display unit 130, and the storage unit 140 described in FIG. 4, and thus the same reference signs are given and the description thereof is omitted.

The control unit 350 includes the acquisition unit 151, the detection unit 152, the attribute determination unit 153, the skeleton estimation unit 154, the parameter optimization unit 155, the evaluation unit 156, the feature amount calculation unit 157, and a data expansion unit 350a. For example, the control unit 350 is realized by a CPU or an MPU. The control unit 150 may also be realized by an integrated circuit such as an ASIC or an FPGA, for example.

Descriptions related to the acquisition unit 151, the detection unit 152, the attribute determination unit 153, the skeleton estimation unit 154, the parameter optimization unit 155, the evaluation unit 156, and the feature amount calculation unit 157 are the same as the contents described in FIG. 4. The parameter optimization unit 155 optimizes the camera parameters by further using the skeleton data of the virtual person generated by the data expansion unit 350a described later.

By executing the processing described in FIGS. 17 to 20, the data expansion unit 350a generates the skeleton data of the virtual person disposed at the disposition point of the image frame.

For example, as described in step S1 in FIG. 17, FIG. 18, and FIG. 19, the data expansion unit 350a estimates the depth reduction rate α based on the change in the size of the person 55a and the size of the person 55b and the change in the y coordinate of the person 55a and the y coordinate of the person 55b.

As described in step S2 in FIG. 17, the data expansion unit 350a analyzes the video data 55 and extracts the candidate points over the ground.

As described in step S3 in FIG. 17 and FIG. 20, the data expansion unit 350a specifies the candidate point for disposing a virtual person from the candidate points p1-1 to p1-8 over the ground. Based on the size of the person 55a and the depth reduction rate α obtained in step S1, the data expansion unit 350a calculates the size of the virtual person 56a disposed at the candidate point p1-8. By adjusting the skeleton data of the person 55a in accordance with the size of the calculation result, the data expansion unit 350a generates the skeleton data of the virtual person 56a. For example, the data expansion unit 350a may generate the skeleton data of the virtual person 56a by multiplying the lengths between the individual joints in the skeleton data of the person 55a by the depth reduction rate α. The data expansion unit 350a outputs the skeleton data of the virtual person 56a to the parameter optimization unit 155.

Figure 22:
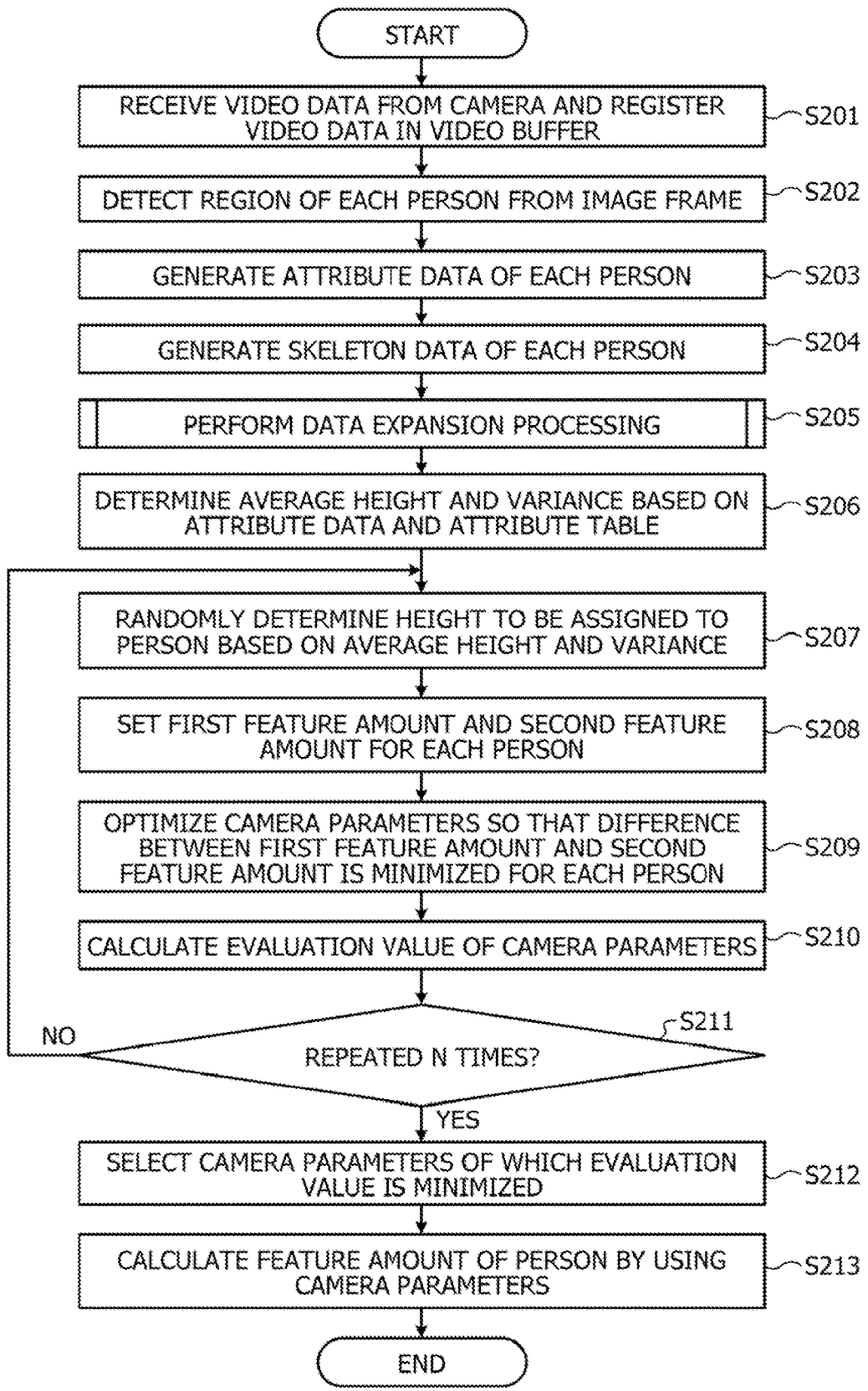
FIG. 22 is a flowchart illustrating a processing procedure of the information processing apparatus according to the second embodiment.

Next, an example of a processing procedure of the information processing apparatus 300 according to the second embodiment will be described. FIG. 22 is a flowchart illustrating the processing procedure of the information processing apparatus according to the second embodiment. As illustrated in FIG. 22, the acquisition unit 151 of the information processing apparatus 300 receives video data from the camera 10, and registers the video data in the video buffer 141 (step S201).

The detection unit 152 of the information processing apparatus 300 detects a region of each person from an image frame (step S202). The attribute determination unit 153 of the information processing apparatus 300 generates attribute data of each person (step S203). The skeleton estimation unit 154 of the information processing apparatus 300 generates skeleton data of each person (step S204).

The data expansion unit 350a of the information processing apparatus 300 executes data expansion processing (step S205).

Based on the attribute data and the attribute table 143, the parameter optimization unit 155 of the information processing apparatus 300 specifies an average height and a variance (step S206). Based on the average height and the variance, the parameter optimization unit 155 randomly determines a height to be assigned to the person (step S207).

For each person, the parameter optimization unit 155 sets the first feature amount and the second feature amount (step S208). For each person, the parameter optimization unit 155 optimizes the camera parameters so that a difference between the first feature amount and the second feature amount is minimized (step S209).

The evaluation unit 156 of the information processing apparatus 300 calculates an evaluation value of the camera parameters (step S210). When the processing of calculating the camera parameters is not repeated N times (No in step S211), the information processing apparatus 300 proceeds to step S207. On the other hand, when the processing of calculating the camera parameters is repeated N times (Yes in step S211), the information processing apparatus 300 proceeds to step S212.

The evaluation unit 156 selects the camera parameters of which the evaluation value is minimized (step S212). By using the selected camera parameters, the feature amount calculation unit 157 of the information processing apparatus 300 calculates a feature amount of the person (step S213).

Figure 23:
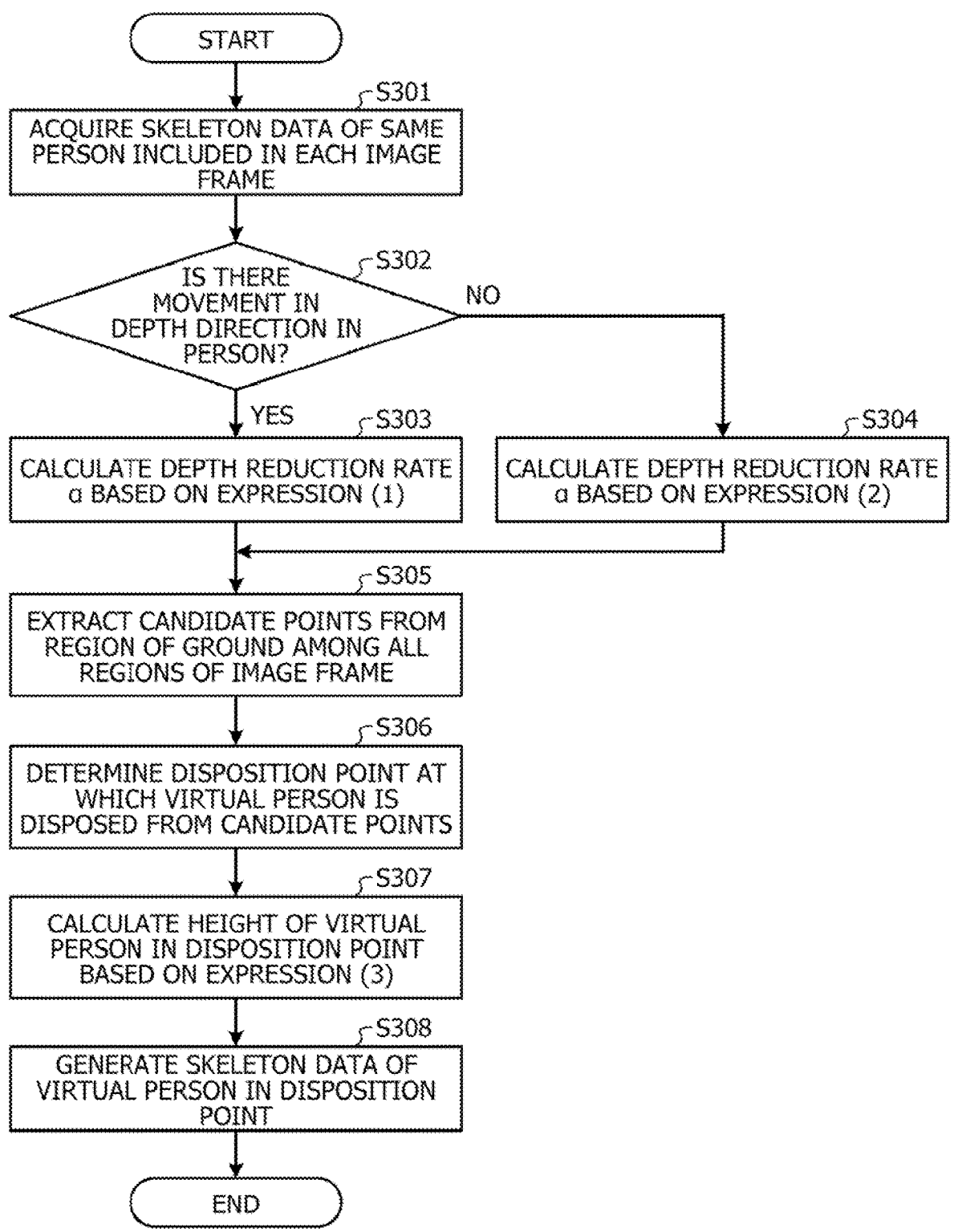
FIG. 23 is a flowchart illustrating a processing procedure of data expansion processing.

Subsequently, an example of the processing procedure of the data expansion processing described in step S205 in FIG. 22 will be described. FIG. 23 is a flowchart illustrating the processing procedure of the data expansion processing. As illustrated in FIG. 23, the data expansion unit 350a of the information processing apparatus 300 acquires skeleton data of the same person included in each image frame (step S301).

When there is a movement in the depth direction in the person (Yes in step S302), the data expansion unit 350a calculates the depth reduction rate $\alpha$ based on Expression (1) (step S303), and the processing proceeds to step S305.

By contrast, when there is no movement in the depth direction in the person (No in step S302), the data expansion unit 350a calculates the depth reduction rate $\alpha$ based on Expression (2) (step S304), and the processing proceeds to step S305.

The data expansion unit 350a extracts candidate points from the region of the ground among all the regions of the image frame (step S305). The data expansion unit 350a specifies a disposition point at which a virtual person is disposed from the candidate points (step S306).

Based on Expression (3), the data expansion unit 350a calculates a height of the virtual person in the disposition point (step S307). The data expansion unit 350a generates skeleton data in the disposition point of the virtual person (step S308).

Next, an effect of the information processing apparatus 300 according to the second embodiment will be described. The information processing apparatus 300 calculates a depth reduction rate of a size of a person due to movement from each image frame included in video data, and generates skeleton data of a virtual person in a case where the virtual person is disposed at a disposition point based on the disposition point over the ground included in the image frame and the depth reduction rate. Accordingly, even when the amount of person size information is small in the video data, the amount of person size information may be added. By adding the amount of person size information, a decrease in the estimation accuracy of the parameters may be suppressed.

The information processing apparatus 300 specifies a region corresponding to the ground from the region of the image frame, and specifies the disposition point from an intersection of straight line components of the region corresponding to the ground. Accordingly, the virtual person may be disposed at an appropriate point in the image frame.

When there is a movement in the depth direction in the person imaged in the video data, the information processing apparatus 300 calculates the depth reduction rate $\alpha$ based on Expression (1). Accordingly, the depth reduction rate $\alpha$ may be calculated by using the skeleton data of the person at each time.

When there is no movement in the depth direction in the person imaged in the video data, the information processing apparatus 300 calculates the depth reduction rate $\alpha$ based on Expression (2). Accordingly, even when there is no movement in the depth direction in the person, the depth reduction rate $\alpha$ may be calculated by using a human body part.

Figure 24:
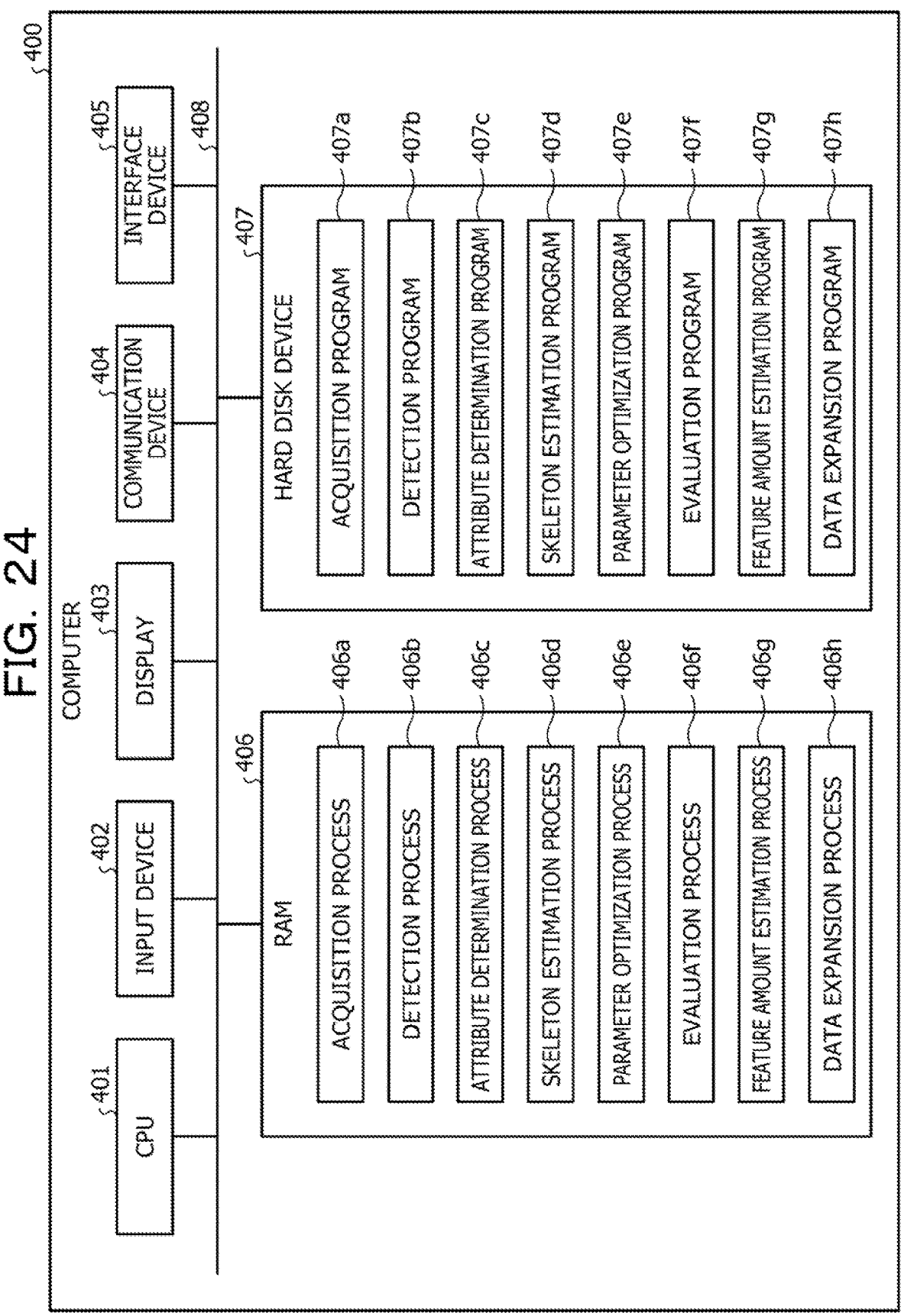
FIG. 24 is a diagram illustrating an example of a hardware configuration of a computer that implements functions similar to those of the information processing apparatus according to the second embodiment.

Next, an example of a hardware configuration of a computer that implements functions similar to those of the information processing apparatus 300 described in the above second embodiment will be described. FIG. 24 is a diagram illustrating an example of a hardware configuration of a computer that implements functions similar to those of the information processing apparatus according to the second embodiment.

As illustrated in FIG. 24, a computer 400 includes a CPU 401 that executes various kinds of arithmetic processing, an input device 402 that receives input of data from a user, and a display 403. The computer 400 includes a communication device 404 that exchanges data with the camera 10, an external device, and the like via a wired or wireless network, and an interface device 405. The computer 400 also includes a RAM 406 that temporarily stores various kinds of information, and a hard disk device 407. Each of the devices 401 to 407 are coupled to a bus 408.

The hard disk device 407 includes an acquisition program 407a, a detection program 407b, an attribute determination program 407c, a skeleton estimation program 407d, a parameter optimization program 407e, an evaluation program 407f, and a feature amount calculation program 407g. The hard disk device 407 includes a data expansion program 407h. The CPU 401 reads each of the programs 407a to 407h and loads the programs to RAM406.

The acquisition program 407a functions as an acquisition process 406a. The detection program 407b functions as a detection process 406b. The attribute determination program 407c functions as an attribute determination process 406c.

The skeleton estimation program 407d functions as a skeleton estimation process 406d. The parameter optimization program 407e functions as a parameter optimization process 406e. The evaluation program 407f functions as an evaluation process 406f. The feature amount calculation program 407g functions as a feature amount calculation process 406g. A data expansion program 407h functions as a data expansion process 406h.

Processing of the acquisition process 406a corresponds to the processing of the acquisition unit 151. Processing of the detection process 406b corresponds to the processing of the detection unit 152. Processing of the attribute determination process 406c corresponds to the processing of the attribute determination unit 153. Processing of the skeleton estimation process 406d corresponds to the processing of the skeleton estimation unit 154. Processing of the parameter optimization process 406e corresponds to the processing of the parameter optimization unit 155. Processing of the evaluation process 406f corresponds to the processing of the evaluation unit 156. Processing of the feature amount calculation process 406g corresponds to the processing of the feature amount calculation unit 157. Processing of the data expansion process 406h corresponds to the processing of the data expansion unit 350a.

Each of the programs 407a to 407h may not be stored in the hard disk device 407 from the beginning. For example, each of the programs 407a to 407h may be stored in a "portable physical medium", such as a flexible disk (FD), a CD-ROM, a DVD, a magneto-optical disk, or an IC card, to be inserted into the computer 400. The computer 400 may read and execute each of the programs 407a to 407h.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an identification program of calibrating a camera parameter to be used in human height estimation from image data captured by a camera, the identification program being a program for causing a computer to execute a process comprising:

acquiring the image data captured by the camera;

analyzing an image frame of a plurality of image frames included in the acquired image data to detect a person included in the image frame, each of the plurality of image frames including a respective image in an image coordinate system;

generating, for the person in the image frame, skeleton information of the person and attribute information indicating an attribute of the person, the attribute information including statistical information that includes an average height in a group of individuals having the attribute of the person, the statistical information further including a first statistical value indicating a variance of height in the group of the individuals having the attribute of the person;

assigning, based on the generated attribute information of the person, a first height in a world coordinate system to the person, the assigning including generating a random height based on the average height and the variance indicated by the first statistical value in the statistical information, and assigning, as the first height, the generated random height to the person;

converting, based on the camera parameter to be calibrated, the first height of the person in the world coordinate system to a second height of the person in the image coordinate system;

setting, as a first feature amount related to a height of the person, second height of the person in the image coordinate system;

setting, based on the generated skeleton information, a second feature amount related to the height of the person; and adjusting the camera parameter based on a difference between the first feature amount and the second feature amount, so as to determine the camera parameter to be used in the human height estimation.

2. The non-transitory computer-readable recording medium according to claim 1, wherein the adjusting of the camera parameter incudes adjusting the camera parameter so that the difference between the first feature amount and the second feature amount in the image frame decreases.

3. The non-transitory computer-readable recording medium according to claim 2, the process further comprising: obtaining a plurality of first feature amounts by performing, a plurality of times, the assigning of the first height, the converting of the first height to the second height, and the setting of the second height to the first feature amount, wherein the adjusting of the camera parameter includes generating a plurality of camera parameters by performing, using each first feature amount of the plurality of first feature amounts, the adjusting of the camera parameter, and the process further comprises calculating a feature amount of the person based on any one of the plurality of camera parameters.

4. The non-transitory computer-readable recording medium according to claim 3, wherein the adjusting of the camera parameter includes:
performing, for each camera parameter of the generated plurality of camera parameters, sub-processing including:

performing the obtaining of the plurality of first feature amounts on the plurality of image frames using the each camera parameter, and obtaining a plurality of differences by calculating, for each first feature amount of the plurality of first feature amounts, the difference between the each first feature amount and the second feature amount, selecting, based on a respective variance of the plurality of differences obtained for each of the plurality of camera parameters, a camera parameter from among the plurality of camera parameters.

5. An identification method implemented by a computer of calibrating a camera parameter to be used in human height estimation from image data captured by a camera, the identification method comprising:

acquiring the image data captured by the camera;

analyzing an image frame of a plurality of image frames included in the acquired image data to detect a person included in the image frame, each of the plurality of image frames including a respective image in an image coordinate system;

generating, for the person in the image frame, skeleton information of the person and attribute information indicating an attribute of the person, the attribute information including statistical information that includes an average height in a group of individuals having the attribute of the person, the statistical information further including a first statistical value indicating a variance of height in the group of the individuals having the attribute of the person;

assigning, based on the generated attribute information of the person, a first height in a world coordinate system to the person, the assigning including generating a random height based on the average height and the variance indicated by the first statistical value in the statistical information, and assigning, as the first height, the generated random height to the person;

converting, based on the camera parameter to be calibrated, the first height of the person in the world coordinate system to a second height of the person in the image coordinate system;

setting, as a first feature amount related to a height of the person, second height of the person in the image coordinate system;

setting, based on the generated skeleton information, a second feature amount related to the height of the person; and adjusting the camera parameter based on a difference between the first feature amount and the second feature amount, so as to determine the camera parameter to be used in the human height estimation.

6. The identification method according to claim 5, wherein the adjusting of the camera parameter incudes adjusting the camera parameter so that the difference between the first feature amount and the second feature amount in the image frame decreases.

7. The identification method according to claim 5, the process further comprising: obtaining a plurality of first feature amounts by performing, a plurality of times, the assigning of the first height, the converting of the first height to the second height, and the setting of the second height to the first feature amount, wherein the adjusting of the camera parameter includes generating a plurality of camera parameters by performing, using each first feature amount of the plurality of first feature amounts, the adjusting of the camera parameter, and the process further comprises calculating a feature amount of the person based on any one of the plurality of camera parameters.

8. The identification method according to claim 7, wherein the adjusting of the camera parameter includes:

performing, for each camera parameter of the generated plurality of camera parameters, sub-processing including:

performing the obtaining of the plurality of first feature amounts on the plurality of image frames using the each camera parameter, and obtaining a plurality of differences by calculating, for each first feature amount of the plurality of first feature amounts, the difference between the each first feature amount and the second feature amount, selecting, based on a respective variance of the plurality of differences obtained for each of the plurality of camera parameters, a camera parameter from among the plurality of camera parameters.

9. An information processing apparatus of calibrating a camera parameter to be used in human height estimation from image data captured by a camera, the information processing apparatus comprising:

a memory; and a processor coupled to the memory and configured to:

acquire the image data captured by the camera;

analyze an image frame of a plurality of image frames included in the acquired image data to detect a person included in the image frame, each of the plurality of image frames including a respective image in an image coordinate system;

generate, for the person in the image frame, skeleton information of the person and attribute information indicating an attribute of the person, the attribute information including statistical information that includes an average height in a group of individuals having the attribute of the person, the statistical information further including a first statistical value indicating a variance of height in the group of the individuals having the attribute of the person;

assign, based on the generated attribute information of the person, a first height in a world coordinate system to the person, the assigning including generating a random height based on the average height and the variance indicated by the first statistical value in the statistical information, and assigning, as the first height, the generated random height to the person;

convert, based on the camera parameter to be calibrated, the first height of the person in the world coordinate system to a second height of the person in the image coordinate system;

set, as a first feature amount related to a height of the person, second height of the person in the image coordinate system;

set, based on the generated skeleton information, a second feature amount related to the height of the person for the person; and adjust the camera parameter based on a difference between the first feature amount and the second feature amount, so as to determine the camera parameter to be used in the human height estimation.

* * * * *